United States Patent [19]
McKechnie et al.

[11] Patent Number: 5,365,224
[45] Date of Patent: Nov. 15, 1994

[54] ERROR RECOVERY ARRANGEMENT IN A TIME DIVISION MULTIPLEX DATA TRANSMISSION SYSTEM

[75] Inventors: Keith J. McKechnie, Harrisburg; Lee W. Steely, Mohnton; Paul S. Chang, Harrisburg, all of Pa.

[73] Assignee: The Whitaker Company, Wilmington, Del.

[21] Appl. No.: 200,848

[22] Filed: Feb. 22, 1994

Related U.S. Application Data

[63] Continuation of Ser. No. 864,453, Apr. 6, 1992, abandoned, which is a continuation-in-part of Ser. No. 558,024, Jul. 25, 1990, abandoned.

[51] Int. Cl.$^5$ .......................... H04Q 5/16; H04Q 9/16; H04J 3/24
[52] U.S. Cl. ........................ 346/825.04; 340/825.07; 340/825.52; 340/825.65; 370/82; 370/93; 377/28; 371/69.1
[58] Field of Search ............... 340/825.04, 825.07, 340/825.08, 825.52, 825.63, 825.64, 825.65, 825.57; 371/57.1, 57.2, 67.1, 69.1, 5.1, 5.2, 5.3, 5.4, 5.5, 11.2; 370/81, 82, 93, 101, 105.1, 100.1, 110.1; 377/28, 50

[56] References Cited
U.S. PATENT DOCUMENTS

| | | | |
|---|---|---|---|
| 4,047,107 | 9/1977 | Dickinson | 375/22 |
| 4,159,448 | 6/1979 | Parham | 370/29 |
| 4,177,453 | 12/1979 | Collins | 340/825.65 |
| 4,245,212 | 1/1981 | Cirimele | 371/69.1 |
| 4,311,986 | 1/1982 | Yee | 340/825.63 |
| 4,536,874 | 8/1985 | Stoffel et al. | 340/825.5 |
| 4,558,316 | 12/1985 | Yong | 340/825.06 |
| 4,872,006 | 10/1989 | Takao | 370/101 |

*Primary Examiner*—Donald J. Yusko
*Assistant Examiner*—Mark H. Rinehart

[57] ABSTRACT

A system for defining and controlling data transmissions in a multiplexing system having a host controller in bi-directional communication with a plurality of remote stations or nodes. The system comprises a series of simple frame flags generally defined as varying periods of inactivity on the bi-directional transmission line. Only specified numbers of transmitted data digits constitute valid transmissions. An arrangement is provided which responds to the receipt of an incorrect number of received digits (an error condition) in a manner which is a function of the number of digits which are actually received.

7 Claims, 19 Drawing Sheets

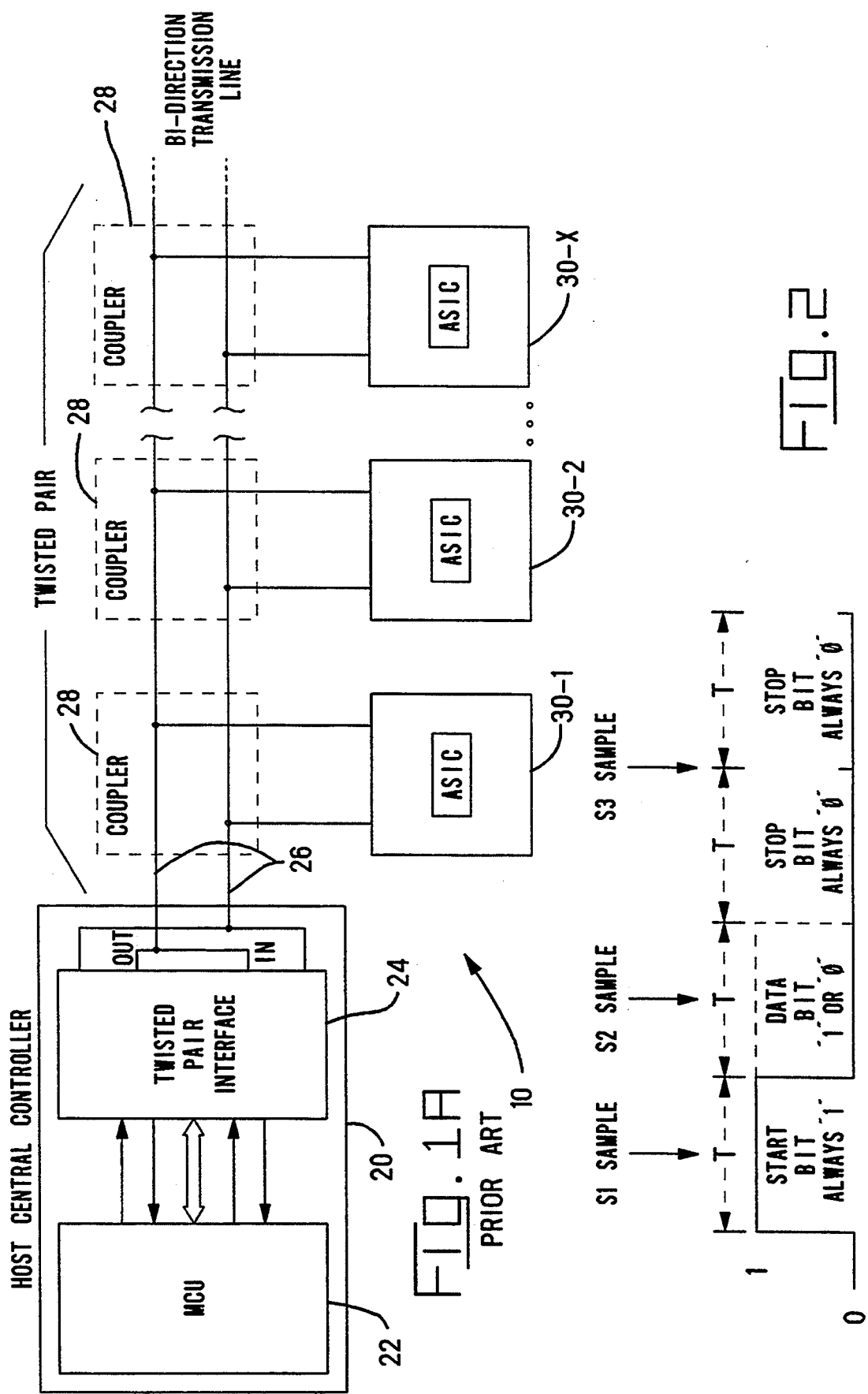

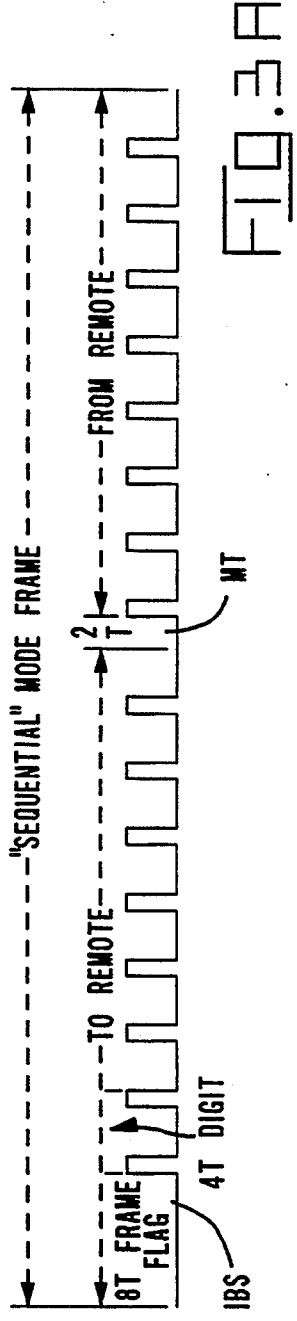
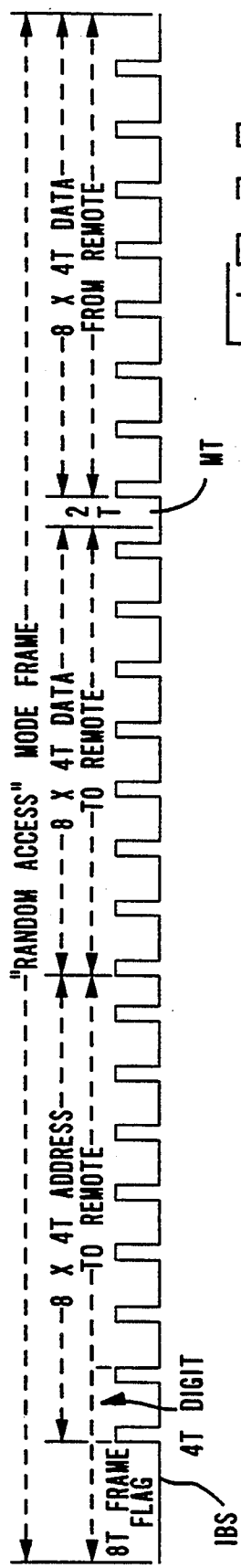
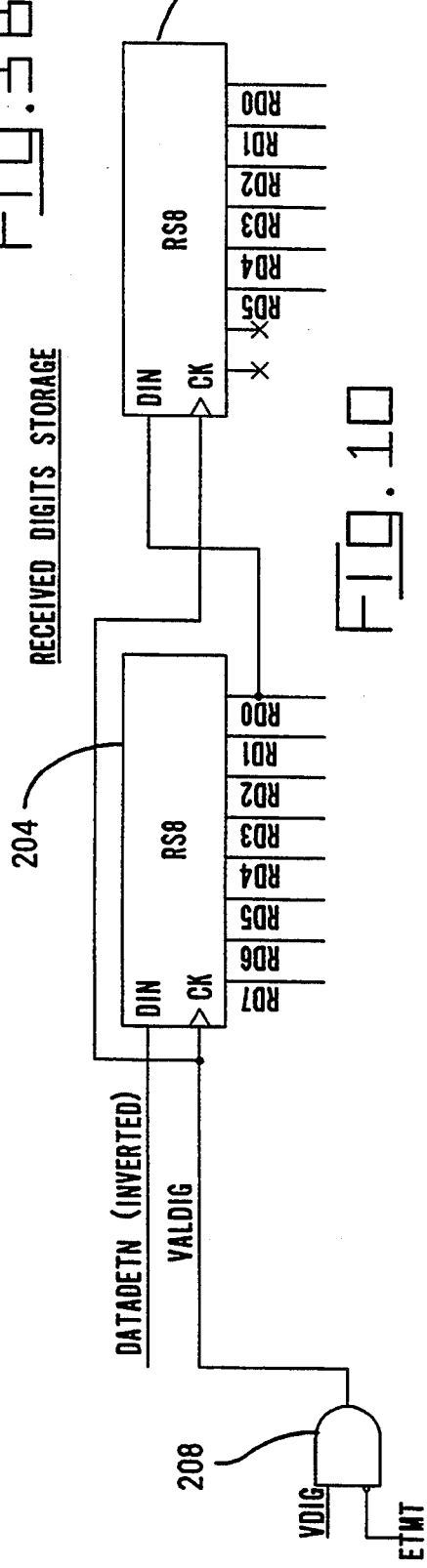

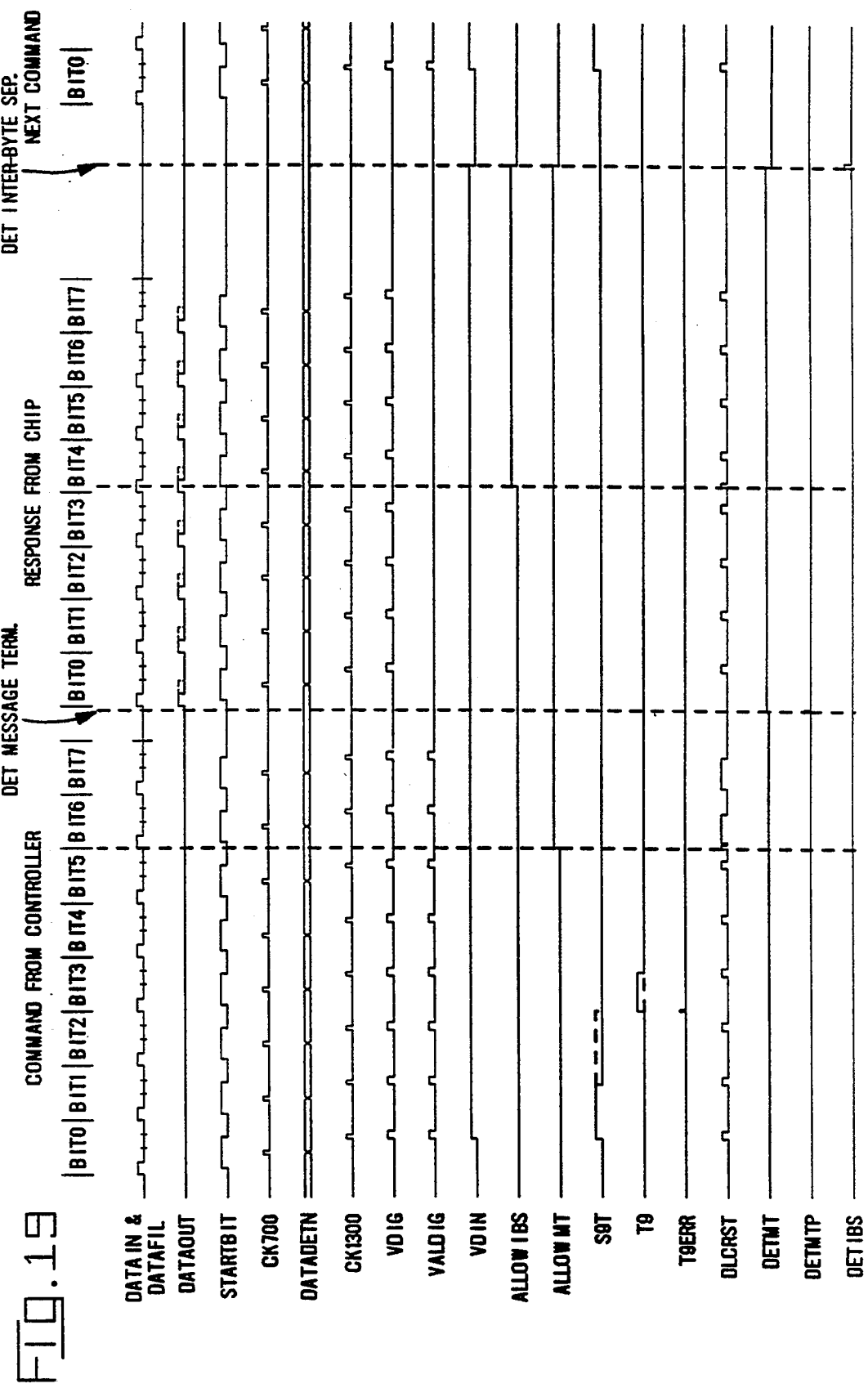

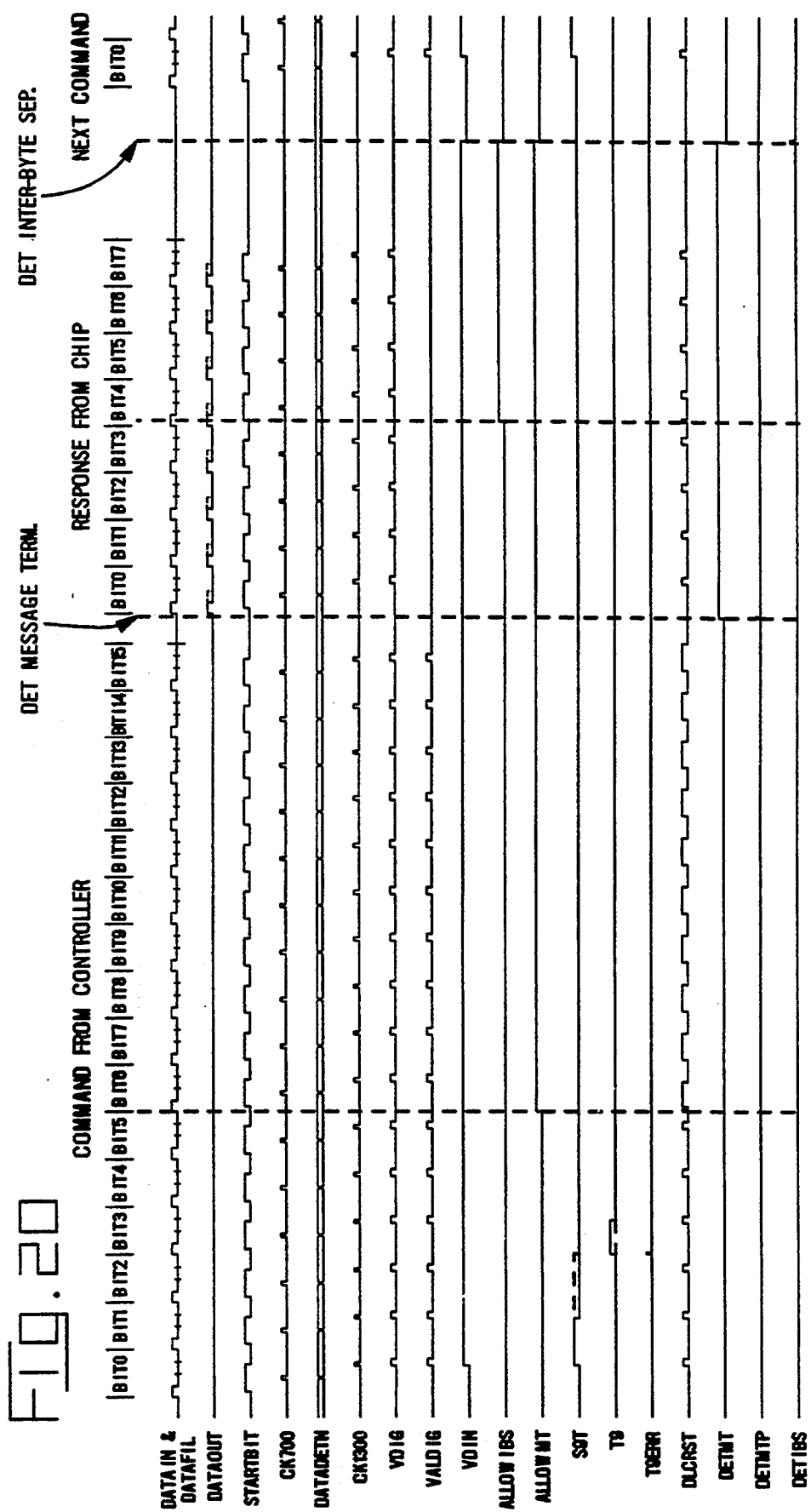

ERROR RECOVERY ARRANGEMENT IN A TIME DIVISION MULTIPLEX DATA TRANSMISSION SYSTEM

This application is a continuation of application Ser. No. 07/864,453 filed Apr. 6, 1992, now abandoned, which in turn, a Continuation-in-Part of application Ser. No. 07/558,024 filed Jul. 25, 1990, now abandoned.

FIELD OF THE INVENTION

This invention relates in general to a time division multiplex data transmission system. More particularly, this invention relates to an error recovery arrangement for data transmitted between a central control unit and a plurality of remote nodes in a time division multiplex system.

BACKGROUND OF THE INVENTION

Multiplexing systems can be defined as digital based electronic schemes for sequentially accessing a variety of remote stations or nodes. Such systems comprise a central control unit connected to a plurality of remote nodes via a bi-directional transmission line. The signals communicated between the central control unit and the remote nodes take the form of electronic bits of information which define either a logic "0" or "1" binary state.

In a time division multiplex system the communicated data is defined by time windows also known as slots or frames. Each bit position within a time window has a predefined meaning which can change based on the addition of complex flagging bits or patterns that may sandwich the data signal bits. An additional or different kind of flag bit may also be included to indicate that more signal bits are coming for a particular frame and/or that selected bit positions are to be redefined.

U.S. Pat. No. 4,311,986 issued to Yee describes a multiplex system in which pulse width modulation is utilized to create a unique address for each remote station in the system. The central processor sends out interrogation pulses of a controlled width, wherein the width identifies the specific remote station which is the intended recipient of the pulse. Each remote station, when it receives an interrogation pulse of the appropriate width, responds by supplying a return pulse on the bus with a delay that encodes the desired information. In the Yee system, the variable width interrogation pulse identifies the remote station by the width of the pulse.

In the system with which the present invention finds utility, the remote stations may be addressed either directly or sequentially. In the latter case, such addressing proceeds in order from a first one of the remote stations to a last one of the remote stations. When the stations are addressed sequentially, the data transmitted by the control unit includes a first number of data digits and the remote stations count the transmissions from the control unit. Each station recognizes when the transmission count equals its assigned address. When a remote station is to be addressed directly, the data transmitted by the control unit includes a second number of data digits which is equal to the first number plus a third number of address data digits. Thus, transmissions from the control unit should include only either the first or the second number of digits. Each of the digits must have a defined set of characteristics in order to be valid and the remote stations examine the received digits as part of the validation routine. However, due to the presence of noise on the transmission line, one or more digits of a data transmission are occasionally "lost". Further, noise on the transmission line can also occasionally appear to be valid digits.

It is an object of the present invention to provide an arrangement in each of the remote stations which reacts to the presence of an incorrect number of received digits in a different manner depending upon the number of digits received.

SUMMARY OF THE INVENTION

The foregoing, and additional, objects are attained in accordance with the principles of this invention by providing an arrangement in a system of the type described wherein the digits within a particular transmission from the control unit are counted. If the number of digits received is less than a defined number, the transmission is ignored. If the number of digits received is within a first defined range including the number corresponding to a sequential address transmission, the transmission is treated as being probably sequential and the address counter is incremented, but the remote station does not transmit data back to the control unit unless the number of digits corresponds exactly to a sequential address transmission. If the number of received digits is in a second defined range including the number of digits corresponding to a direct addressing transmission, but is not equal to that number of digits, the transmission is treated as being an improper direct addressing transmission. In this situation, no data is transmitted to the control unit and no further counting of sequential addressing transmissions is performed until either a frame reset condition is detected or a proper direct address transmission is received.

BRIEF DESCRIPTION OF THE DRAWINGS

The objects, features and advantages of the invention may be understood by reference to the following detailed description taken in conjunction with the drawings in which:

FIGS. 1A and 1B are block diagrams showing two examples of the interconnections of a multiplexing system;

FIG. 2 illustrates the bit sequence of a 4T digit;

FIG. 3A illustrates the bit sequence for a "sequential" mode transmission;

FIG. 3B illustrates the bit sequence for a "direct" or "random access" mode of transmission;

FIG. 10 illustrates one embodiment of the Received Digit/Address Storage Device represented in block form in FIG. 4;

FIG. 19 is a timing diagram illustrating the Sequential Access Mode with response back from the ASIC shown in FIG. 4; and FIG. 20 is a timing diagram illustrating the Random Access Mode with response back from the ASIC shown in FIG. 4.

DETAILED DESCRIPTION OF THE PRESENTLY PREFERRED EMBODIMENTS

The embodiment described herein is applicable to any system utilizing a control unit having bi-directional electronic communication with at least one remote node. By way of example, the invention will be described in conjunction with certain relevant aspects of a particular control-type multiplexing network.

The real-time control-type multiplex system described herein replaces the multiple copper harness wires of a conventional control system with a simple twisted pair which distributes information and control signals by constantly repeating the control signals. Communication can be achieved even in noisy environments with a minimal amount of addressing overhead.

Figure 1B:
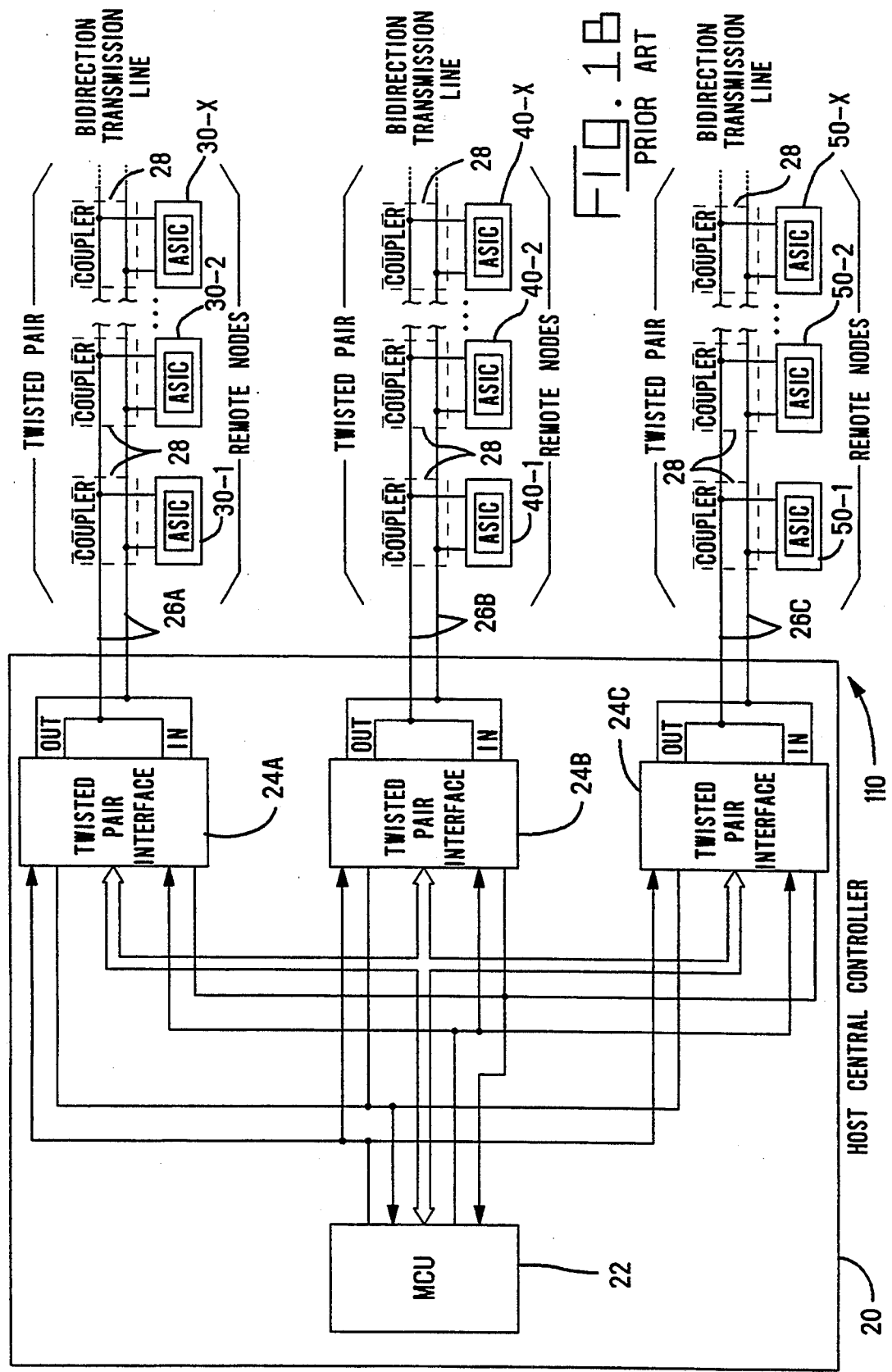

In the systems shown in FIGS. 1A and 1B, data bits are transmitted in both directions (i.e., bi-directionally) in constantly repeating frames with up to several thousand frames per second. The particular frame time is dependent upon the number of addressed nodes, the allowed signal propagation delay and the amount of time allowed for central controller processing. By constantly repeating frames, the systems can provide high speed communications (up to ½ megabits per second) over several hundred feet using a conventional bus, or over several thousand feet using a loop bus. Even greater distances are possible with slower speeds of operation.

The systems shown in FIGS. 1A and 1B center around the basic structure of issuing a command to a particular device at a particular address, and making sure that the command was communicated properly to the intended device. As seen in FIG. 1A, the basic multiplex control system 10 generally comprises a host central controller 20 connected to a plurality of remote nodes, 30-1 to 30-x, via a series of twisted pairs 26. The host central controller 20 comprises a micro-controller unit (MCU) 22 and a twisted pair interface 24 designed to interact with the MCU 22 and direct the various outputs and inputs to and from the remote nodes, 30-1 to 30-x. The incoming signals to the twisted pair interface 24 are filtered by a simple digital filter (not shown), which rejects state changes that are less than a designated length in duration, for example, 100 ns. The rising edge of the filtered signal triggers a set of timers for sampling the incoming pulse at S1, S2 and S3 in a manner to be described. FIG. 1B illustrates what is known as a star-bus bi-directional interconnection system 110, which is an alternative configuration for the basic bi-directional system shown in FIG. 1A. As seen in FIG. 1B, the MCU 22 is connected to a set of three twisted pair interface sections 24-A, 24-B, 24-C. Each of the twisted pair interface sections is connected to a separate set of remote nodes, 30-1 to 30-x, 40-1 to 40-x and 50-1 to 50-x. The star-bus system provides a high degree of reliability and prevents damage in one part of the network from interfering with the operation of other parts of the network.

The host controller 20 may communicate with a network of up to 64 remote nodes over a single twisted pair of communication wires. Each remote node provides 8 digits of input and output data with each digit comprising 4 bit positions (4T), as seen in FIG. 2. The nodes may be powered either locally or over another pair of distributed wires from the central controller. The remote nodes are application specific integrated circuits (ASIC) which include the necessary physical means to either directly or indirectly connect to the transmission lines, and also include sufficient electronics to extract signals from the transmission lines, place signals onto the transmission lines, and detect selected periods of inactivity referred to herein as an interbyte separator (IBS) and message terminator (MT).

A sequential access protocol is provided, as well as a random, or direct, access protocol. In the sequential access protocol, 8 digit data frames are written to and then read from each node in succession, using implied addressing. Once all of the nodes have been serviced, the cycle is repeated, continuously refreshing the state of each node. The random access protocol communicates in a similar fashion except that an 8 digit address frame is sent identifying a particular node in the network along with the 8 digit data frame. The sequential or random access protocols of communication, along with the direction of communication, are determined by the detection of MT and IBS which will be described in detail herein. Thereby, the transmission protocols may be mixed within any given frame.

Data signals can be read from or written to the remote nodes in a variety of schemes. One such scheme is illustrated in FIG. 2, in which the rising edge of the first bit provides synchronization. Each bit is 1T wide and four bits form a single digit. Digit decoding occurs at various points in the network including the twisted pair interface 24, 24A-24C, and the ASIC remote nodes. Digit decoding can be accomplished by sampling the received waveform at S1, S2 and S3. S1 and S3 sample the start and stop bits, while S2 samples the data bit. S1 must be a logic "1" and S3 must be a logic "0" in order to sample a valid data bit at S2 which can be "0" or "1". If either S1 is at "0" or S3 is at "1" then the decoding circuitry (described below) takes no action and the sampled data bits are treated as invalid pulses resulting from either a short or long noise burst.

In most multiplex control systems, the meaning of each data bit position can change based on the addition of complex flag bits or patterns that may sandwich the data bit. An additional or different kind of flag bit or sequence may also be included to indicate that more data bits are coming to a particular frame, and that these bit positions are to be redefined. In the system of FIGS. 3A and 3B, special flag bits of the type described above are eliminated and the definition of the data is determined by detection of IBS and MT periods of inactivity on the transmission line. Thus, only one kind of flag bit is provided, the purpose of which is to set the barriers between frames of data.

The IBS frame flag of the inventive system comprises, in this example, at least 8T of inactivity on the transmission line after a valid 4T data digit, as seen in FIGS. 3A and 3B. Both the sequential and random access protocols begin with the same IBS flag. Inherent in this scheme is the need for the receiving device to make a decision as to how many digits were detected and act accordingly. In the system of FIGS. 3A and 3B, this is accomplished by detecting a MT comprising, in this example, 2T of inactivity on the transmission line after a valid 4T data digit. As shown in FIG. 3A, the MT period of inactivity is after eight digits indicating that the preceding transmission was in the sequential access mode. In FIG. 3B, MT is after sixteen digits (eight digit address plus eight digit data frame) indicating that the preceding transmission was in the random access mode. At this point the receiving ASIC can interpret the mode and data, and then send response data back to the host controller. However, the beginning of response data transmission may need to be delayed by at least twice the value of the worst case tolerance of the circuits that lead up to and determine the MT time interval. Such a delay is referred to as the transmit hold-off (THO) and insures that reception and transmission of data by an addressed device with a fast MT interval is not treated as continued data from the controller by a device with a slow MT time interval.

Figure 4:
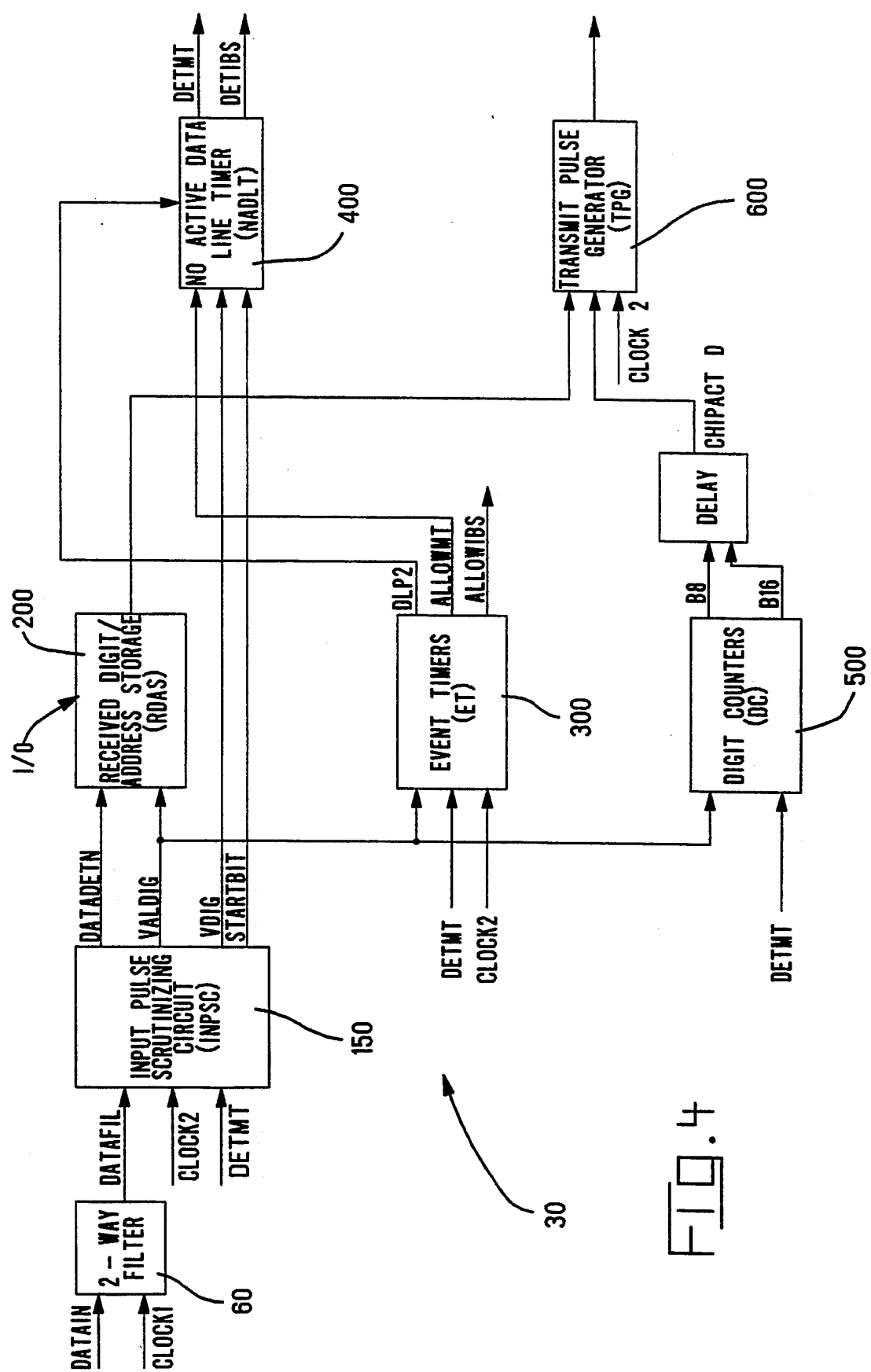
FIG. 4 is a block diagram of the ASIC embodying the system shown in FIGS. 3A and 3B.

FIG. 4 illustrates a block diagram of the ASIC 30 for carrying out time division serial communication utilizing the IBS and MT detection scheme described above. The ASIC 30 may be implemented with or without an external clock and both approaches are described herein. The 100 nsec two-way filter 60 is designed to block any pulses that are shorter than 100 nsec. The input pulse scrutinizing circuit (INPSC) 150 is an asynchronous to synchronous converter which separates clock (VALDIG) and data (DATADETN) signals and validates the incoming data digit by sampling the same at S1, S2 and S3 in the manner described above. The VALDIG and DATADETN signals are then used to strobe information into the received digit/address storage (RDAS) 200 and count how many digits are received within a given time frame by way of the digit counter (DC) 500. The event timers (ET) 300, no active data line timer (NADT) 400 and transmit pulse generator (TPG) 600 are used to time events, detect IBS/MT and transmit response data from the ASIC when selected.

Figure 5:
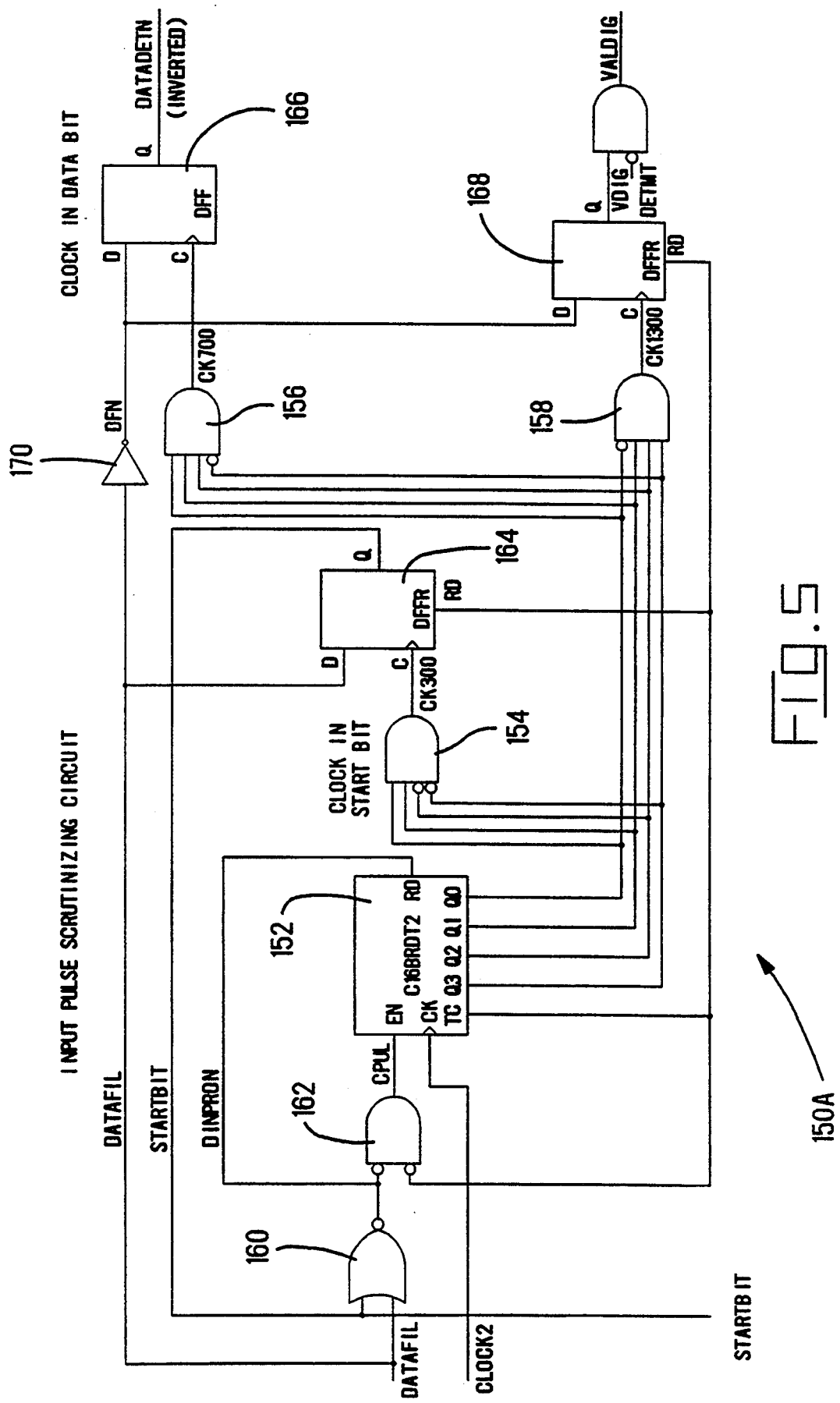
FIG. 5 illustrates one embodiment of the Input Pulse Scrutinizing Circuit represented in block form in FIG. 4.

FIG. 5 illustrates at 150A the schematic details of the INPSC 150. This circuit 150A validates data coming into the ASIC by sampling the transmission Line at various time periods in progression (S1, S2, S3). The system clock is labelled clock-2 and, in this example, is approximately 5 clocks per time base unit (T). In order to have a valid digit, the first T state must be logic high, the second T state (the actual data) can be high or low, and the third and fourth T states must always be low. A counter 152 is provided having count enable (EN), reset direct (RD) and clock (CK) inputs, and Q0–Q3 and terminal count (TC) outputs. A rising edge of the filtered data line, DATAFIL, enables the counter 152 via NOR gate 160 and an inverted input AND gate 162. The counter 152 is used to time-out the S1, S2 and S3 sample points which are determined by AND gate decoders 154, 156, and 158, respectively.

The first sample S1 is taken 3 clocks or 3/5 (0.6) into the first T state. Decoder 154 clocks a flip-flop 164 whose D-input is connected to DATAFIL. The Q-output of flip-flop 164 is labeled STARTBIT and is fed back to the input of the counter 152 via NOR gate 160 in order to keep the counter 152 enabled if the sample at S1 is high. The second sample S2 is the actual value of the data bit and is taken by decoder 156 at 7 clocks into the 4T digit or 2/5 (0.4) into the second T state. Decoder 156 clocks flip-flop 166 whose D-input is connected through an inverter 170 to DATAFIL. The Q-output of flip-flop 166 is input to RDAS 200 (FIG. 4). The third sample S3 is taken by decoder 158 at the 13th clock which is 3/5 (0.6) into the third T state. At S3, the data line must be low in order to validate the digit. DATAFIL passes through inverter 170 to the D-input of flip-flop 168 which is clocked at the S3 sample point. The Q-output of flip-flop 168 is the VALDIG signal which is active high because of the inversion on the data line.

TC is used to reset the first and third sampling flip-flops 164 and 168, and to disable the counter 152 when it reaches the 15th clock. Therefore, the counter outputs Q0–Q3 are each active high for 2 clocks. When the STARTBIT signal goes low, it keeps the counter 152 disabled until it receives another rising edge from the data line.

Figure 6:
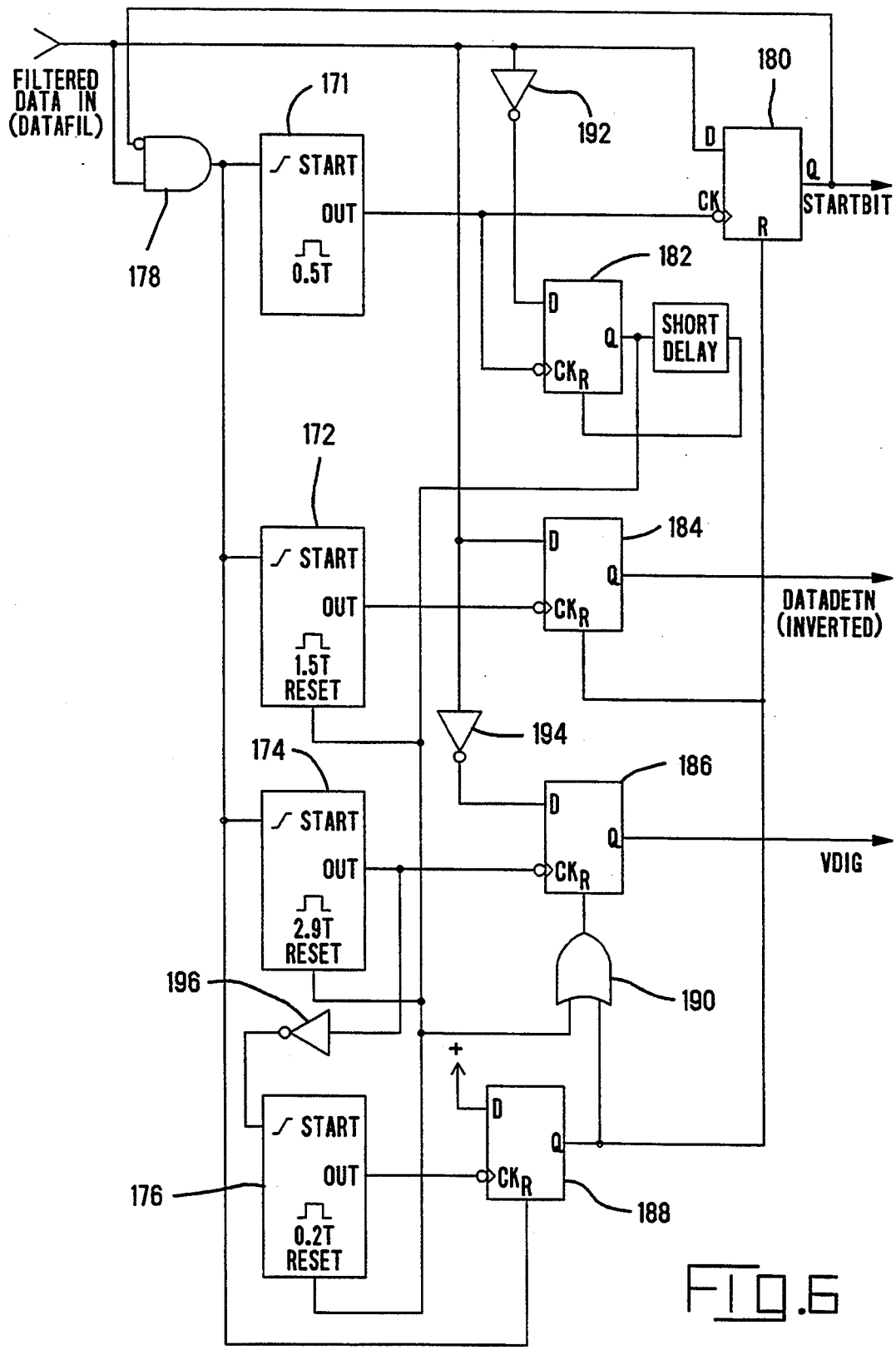
FIG. 6 illustrates another embodiment of the Input Pulse Scrutinizing Circuit represented in block form in FIG. 4.

Another embodiment of the INPSC is shown in FIG. 6 at 150B, utilizing 4 timers 171, 172, 174, 176 and no external clock. A rising edge pulse on the input of any of the timers sends the output high. With no additional activity on its input, the timer output will return to low after the selected time-out value. If the input goes low and back high before the output times out, the output will stay high and give a fresh time cycle from the new rising edge on the input. A high on the reset input will set the output low immediately. If the reset input remains high, rising edges on the normal input are ignored and do not start the timer.

The timers shown in FIG. 6 are labeled with a time-out time which is T multiplied by a constant. Timer 171 is set to time-out after 0.5 T. A rising edge on the DATAFIL input starts timers 171, 172 and 174. If the line is stable, the output of timer 171 will go low and clock flip-flop 180 which latches the status of DATAFIL. The Q-output of flip-flop 180 is STARTBIT and is fed back to an INHIBIT gate 178 on the input of timers 171, 172, 174. If DATAFIL is latched high, then the output of the INHIBIT gate 178 will be set low which prevents any future noise on the filtered data input line from re-triggering the timers 171, 172, 174. If DATAFIL is sampled low at 0.5T then flip-flop 182 is clocked which sends a short reset pulse to timers 172, 174, 176 which allows the timers to accept another rising edge input. All data digits must pass this 0.5T test first before continuing.

After DATAFIL passes the 0.5T test, the 1.5T timer 172 times-out and clocks flip-flop 184, the D-input of which is connected to the filtered data line. At 1.5T, the actual data state is presented on the transmission line and the Q-output of flip-flop 184 stores the actual data value. Next, the 2.9T timer 174 times out and clocks flip-flop 186, the D-input of which is connected to the filtered data line through an inverter 194. If DATAFIL is low, the Q-output signal, VDIG, goes high. VDIG is used to sequence operations in several places throughout the ASIC.

Figure 7:
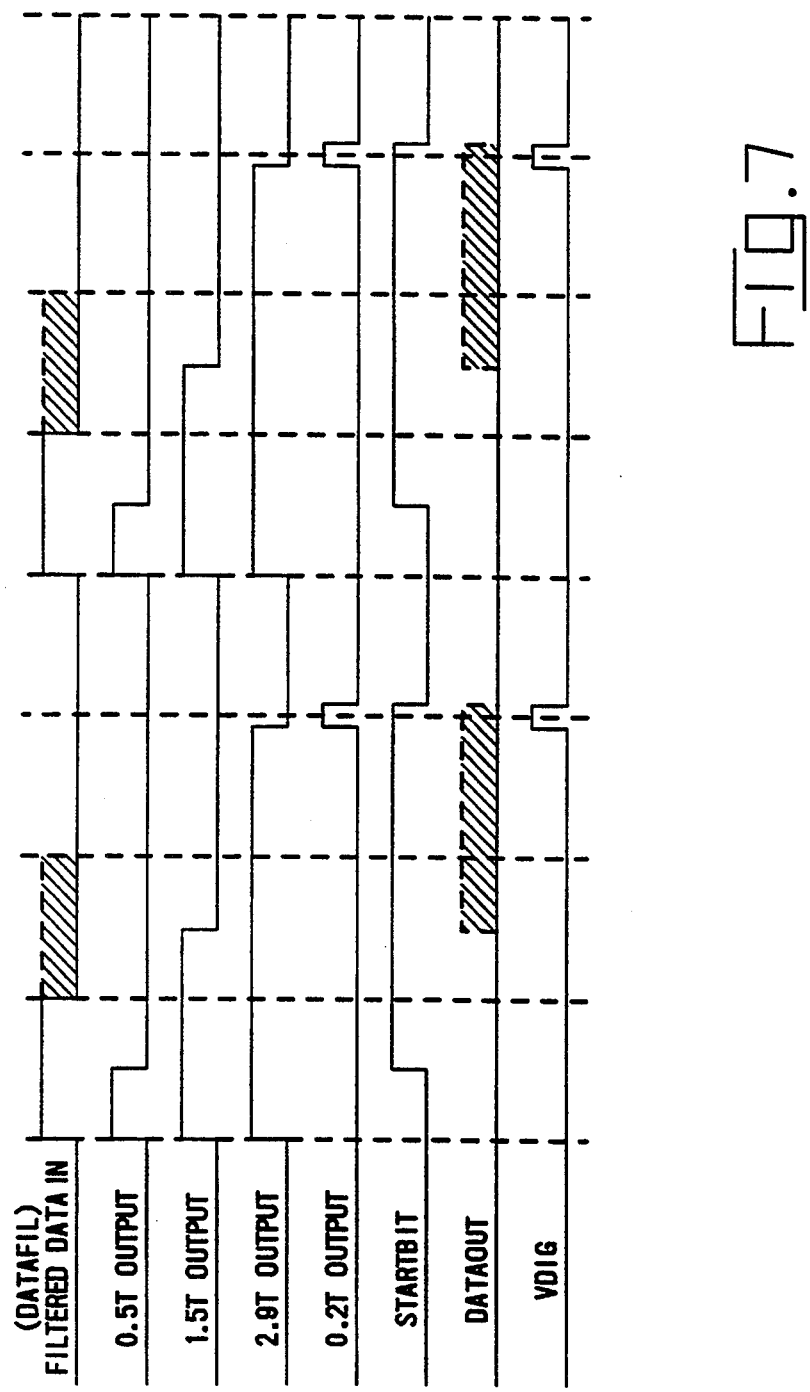
FIGS. 7–9 are timing diagrams illustrating the various input and output states for the Input Pulse Scrutinizing Circuit represented in block form in FIG. 4.
Figure 8:
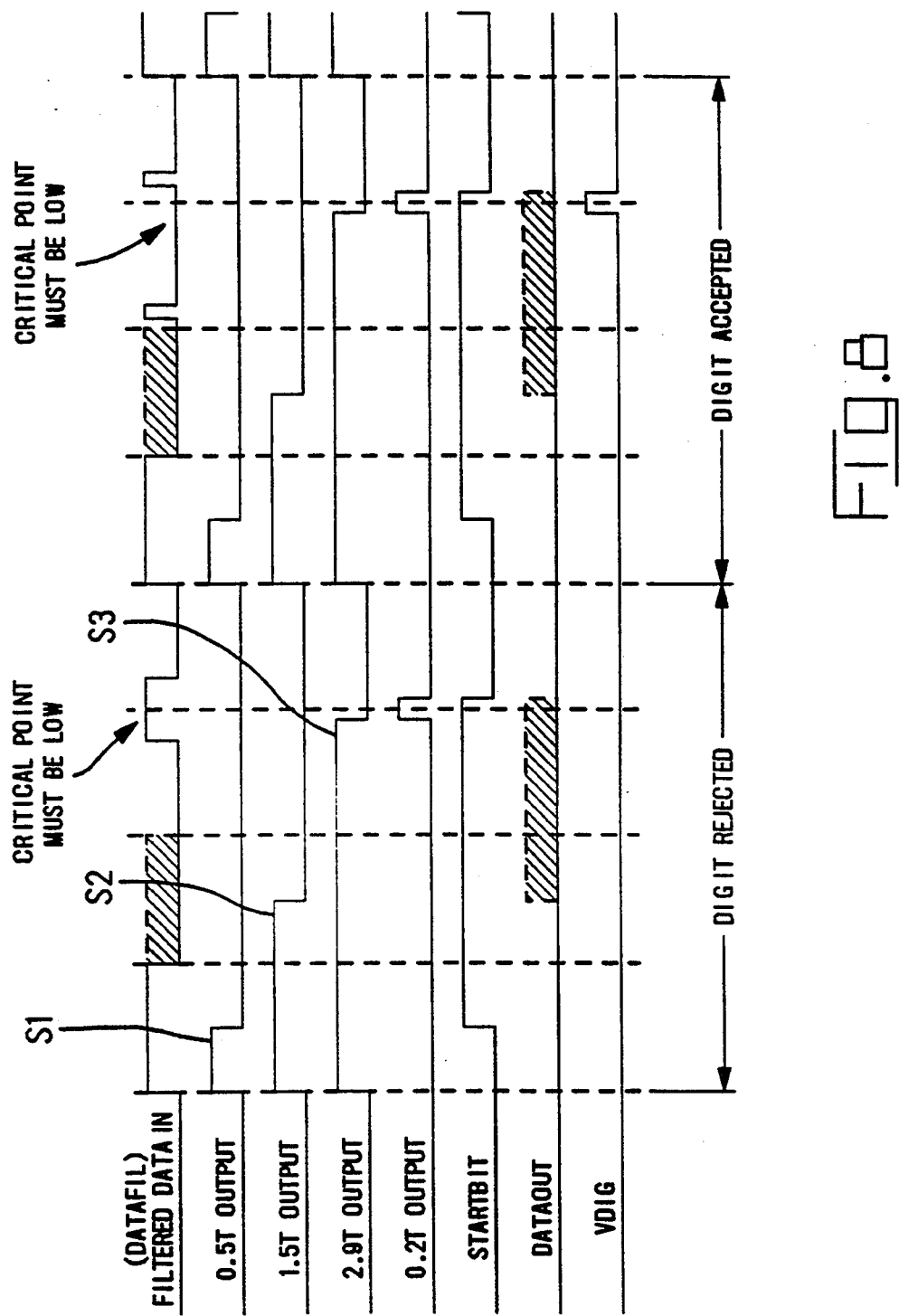
Figure 9:
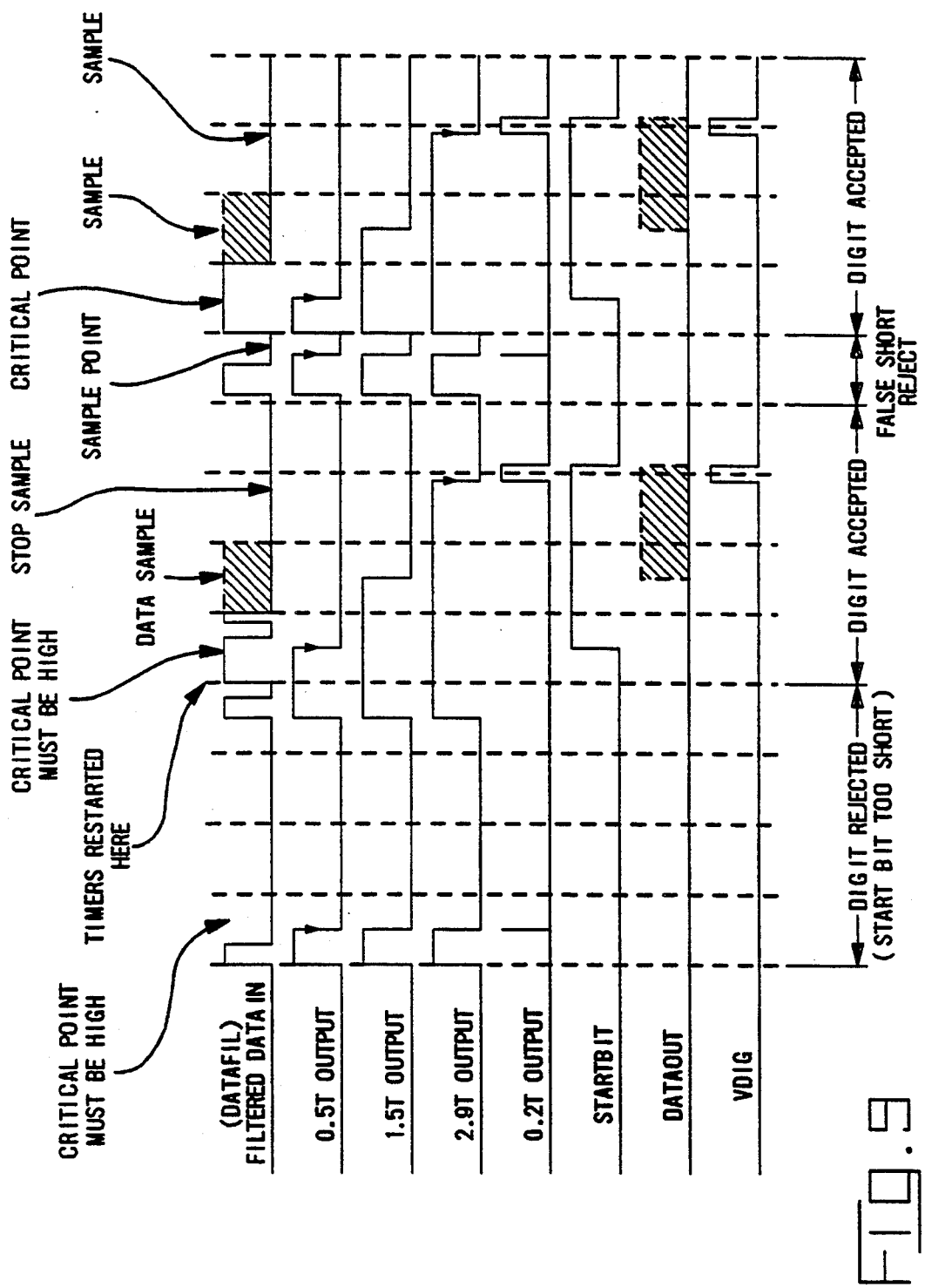

The last timer is the 0.2T timer 176 which is used to reset flip-flops 180, 184, 186. Thereby, the INHIBIT gate 178 at the 0.5T timer 171 input is enabled which re-enables the INPSC to accept input pulses again. The 0.2T timer 176 is started by the falling edge of the 2.9T timer 174 output. This is effectively 3.1T after the rising edge of the incoming DATAFIL. The 0.2T timer 176 allows VDIG to be high long enough to perform other functions in the node and to reset the STARTBIT flip-flop 180. FIGS. 7-9 are timing diagrams illustrating the S1, S2 and S3 critical points for various sequences of accepted and rejected digits in the INPSC.

FIG. 10 is a schematic diagram of RDAS 200 shown in FIG. 4. DATADETN, which is the stored inverted data, and VALDIG, which is the valid digit signal for digits communicated prior to MT, are inputs to RDAS. DATADETN is shifted in to two 8-bit shift registers which are serially connected via Q7 of register 204 and DIN of register 206. VALDIG is connected to the clock input (CK) of each shift register 204, 206. VALDIG clocks are blocked from entering the shift registers during the ASIC response time by the signal Detect Message Terminator (DETMT) via an AND gate 208. Thus, data is shifted into RDAS only while the host controller 20 is sending data.

DATADETN is connected to DIN (data in) of the first shift register 204. Data is transmitted from the host controller with the least significant digit first. Eight digits are sent from the host controller in Sequential Access and sixteen digits are sent in Random Access. In Sequential Access, the eight digits represent the output data to be conveyed to the ASIC remote node. When in Random Access, the first six digits are address information with the least significant digit first. The next two digits are spare digits, and the last eight digits are output data information. When a valid 16 digits are detected, the contents of the register 206 are loaded into an address counter 207, the contents of which are compared with a preset address stored in an address register 209 for the particular remote station. When the contents of the address as determined by the comparator 211, counter match the preset address, an address compare (ADDCOMP) signal is generated on the line 213. The address counter is also used when counting transmissions from the control unit for sequential accessing of the remote stations. Thus, after a direct access, sequential accessing picks up from the address of the remote station which was directly accessed.

Figure 11:
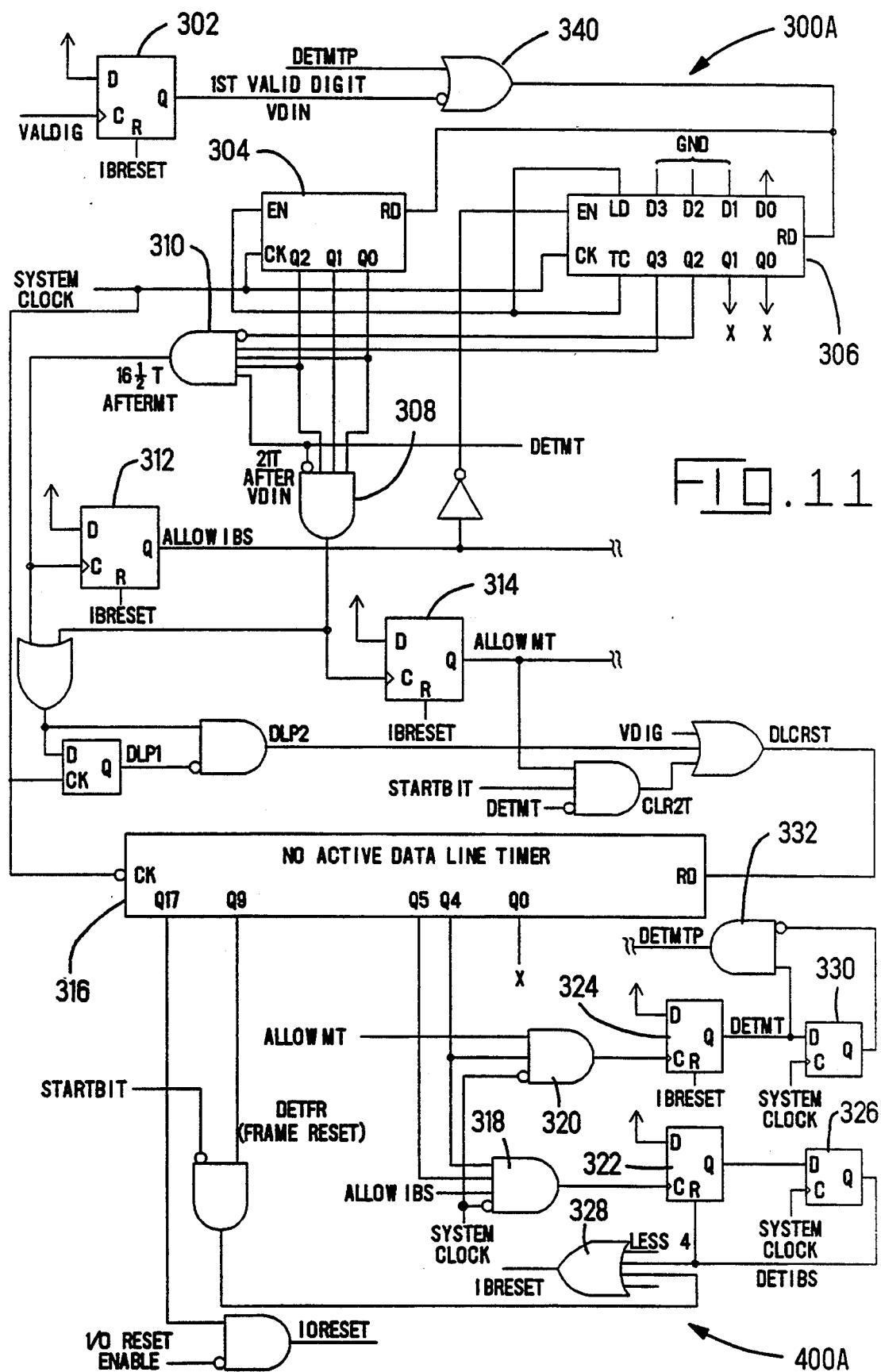
FIG. 11 illustrates one embodiment of the Event Timers and No Active Data Line Timer represented in block form in FIG. 4.

FIG. 11 is a schematic representation at 300A of the Event Timers 300 shown in the block diagram of FIG. 4. The first VALDIG signal from INPSC sets flip-flop 302, the Q-output (VDIN) of which triggers the reset direct (RD) of two counters 306, 304 via the inverted input of an OR gate 340. The first counter 306 is a 4-bit counter with a pre-load of 0001, and the second counter 304 is a 3-bit counter. Each count on the 3-bit counter 304 is equivalent to 3T.

The first event timer is the 21T after VDIN timer which is in operation while the ASIC is receiving digits from the controller. The AND decoder 308 on the 3-bit counter is set to output a high signal at 21T after the first valid digit, VDIN. The rising edge of the output from the AND decoder 308 sets flip-flop 314 which has a Q-output labelled "ALLOWMT."

The next event timer is set to time out at 16½ T after MT, which is after the controller concludes digit transmission. The AND decoder 310 on the 3-bit counter 304 is set to 15T, however, two additional lines are connected from the 4-bit counter which forms an 8-clock decode. This contributes an additional 1½T for a total of 16½T.

The rising edge from the AND decoder 310 sets a flip-flop 312 which has a Q-output labelled "ALLOWIBS." The IBS is defined in this circuit as the detection of 9T of inactivity on the data line from the trailing edge of the STARTBIT signal on a digit that has been validated. This signifies the end of the ASIC response period and the controller sends data to the next ASIC node. The detection of IBS is disallowed until 16½T after MT. The ALLOWIBS signal, when active, will disable the counters 304, 306 since there are no more events until the start of the next transmission from the controller. The ALLOWIBS signal is reset by an Inter-Byte Reset (IBRESET) signal generated at OR gate 328 by the detection of IBS.

Figure 12:
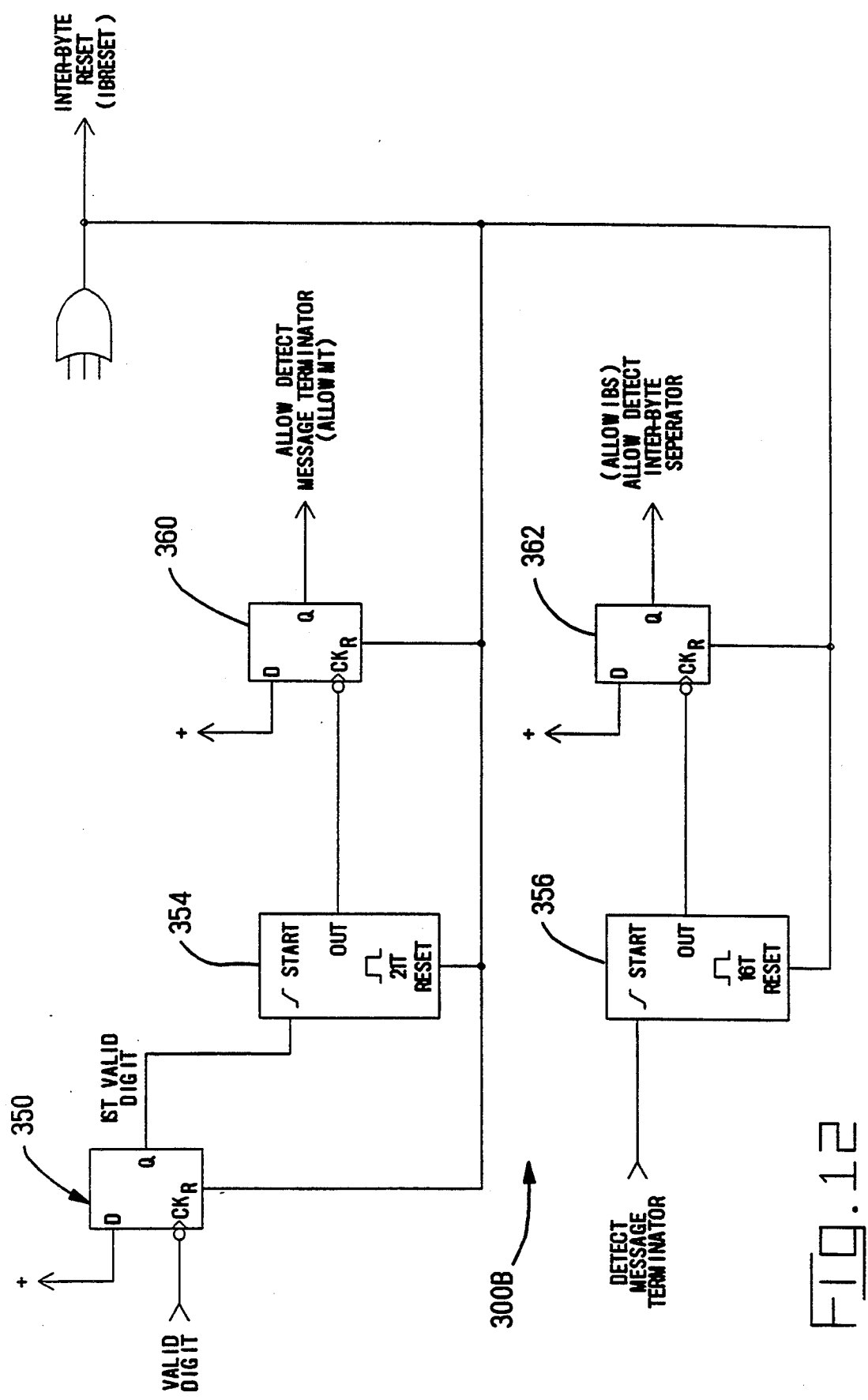
FIG. 12 illustrates another embodiment of the Event Timers represented in block form in FIG. 4.
Figure 13:
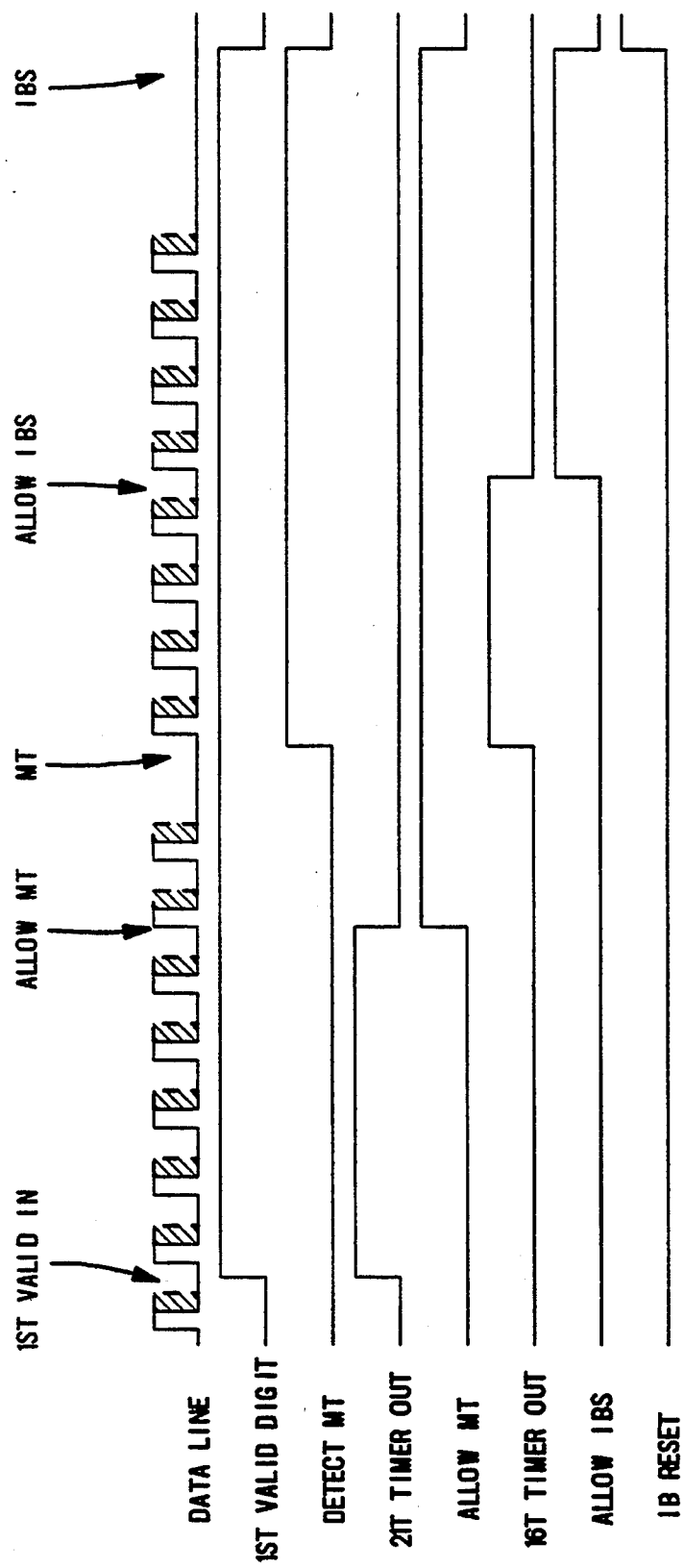
FIG. 13 is a timing diagram illustrating the various input and output states for the Event Timers shown in FIG. 12.

An alternate method of implementing the event timers 300 is shown in FIG. 12. VALDIG clocks flip-flop 350 with its D-input tied high. The result is a high going signal on the Q-output of the flip-flop 350 which is used to start the 21 T timer 354, the output of which will go high immediately. After 21 T, the timer 354 output will go low and clock a flip-flop 360 that has its D-input tied high, thus, the Q-output will go high. This Q-output is labeled ALLOWMT and must stay high until IBRESET to reinforce the MT signal which otherwise might prematurely go inactive. IBRESET is used to reset flip-flop 360 and timer 354. The 16T timer 356 is started by the MT signal, the detection of which will be described herein. The output of the timer 356 goes high immediately, and after 16T the output returns to low. The trailing edge of this output clocks flip-flop 362 having its D-input tied high, thus, the Q-output goes high. This Q-output is labeled ALLOWIBS and only needs to be high until IBS is detected. IBRESET is used to reset this flip-flop 362 and timer 356. FIG. 13 is a timing diagram illustrating the various states of the inputs and outputs for the circuit 300B shown in FIG. 12.

FIG. 11 also illustrates a schematic representation of NADLT 400 represented in the block diagram of FIG. 4. The signals decoded from this timer include, Frame Reset (DETFR), I/O Reset (IORESET), Detect Message Terminator (DETMT) and Detect Inter-Byte Separator (DETIBS). One composite counter 316 is used for all signals. DETMT and DETIBS are discussed in detail hereinafter. DETFR (Frame Reset) is generated when there is a period of 100T with no activity on the transmission line. This results in the address counter being reset. IORESET is generated when there is a period of 40,000T with no activity on the transmission line.

The reset direct, DLCRST, of the counter 316 is shown in the timing diagrams of FIGS. 19 and 20, and is made up of several signals: VDIG, which is two clocks long at the 2.6T validation point of a received digit; DLP2, which is one clock long at the rising edges of ALLOWMT and ALLOWIBS signals; and CLR2T, which is the STARTBIT signal after MT is allowed but before MT is detected.

The DETIBS signal is decoded by the Q4 and Q5 lines of the counter 316 which provide a total of 48 clocks after the last DLCRST. This is actually equivalent to 9.6T from the S3 sample point of the last valid digit. Q4 and Q5 are inputs to an AND gate 318 which also requires that IBS is allowed (ALLOWIBS signal high) and the clock line is low. If these signals are active, the AND gate 318 will clock a flip-flop 322. The Q-output of flip-flop 322 is connected to the D-input of flip-flop 326 which is clocked by the rising edge of the system clock. The Q-output of this flip-flop 326 is DETIBS and is fed back to the reset line of flip-flop 322. Therefore, the DETIBS signal is limited to one clock. The DETIBS signal is fed into a 4-input OR gate 328 which issues the IBRESET.

The DETMT signal is decoded by the AND gate 320 at the Q4 line of the counter 316, which provides a total of 16 clocks after the last DLCRST. This is actually equivalent to 3.2T from the S3 sample point of the last valid digit. Q4 is input to AND gate 320 along with ALLOWMT and CLOCK. If the above signals are active, the AND gate will clock and set flip-flop 324 which will produce a DETMT signal at its Q-output. Flip-flop 324 is then reset by the IBRESET.

The DETMT signal indicates a status change in the ASIC node from receiving data to transmitting data or waiting for another node to transmit data. It is also desirable to have a quick ½ clock period pulse. This pulse, DETMTP, is derived from the system clock and DETMT using flip-flop 330 and AND gate 332, and is used to reset the counters 304, 306 back to zero T (via OR gate 340). The counters 304, 306 must be reset because the decoding from the counters 304, 306 is either before MT or after MT. DETMTP is also used as a delay setup for the chip active signal described below.

Figure 14:
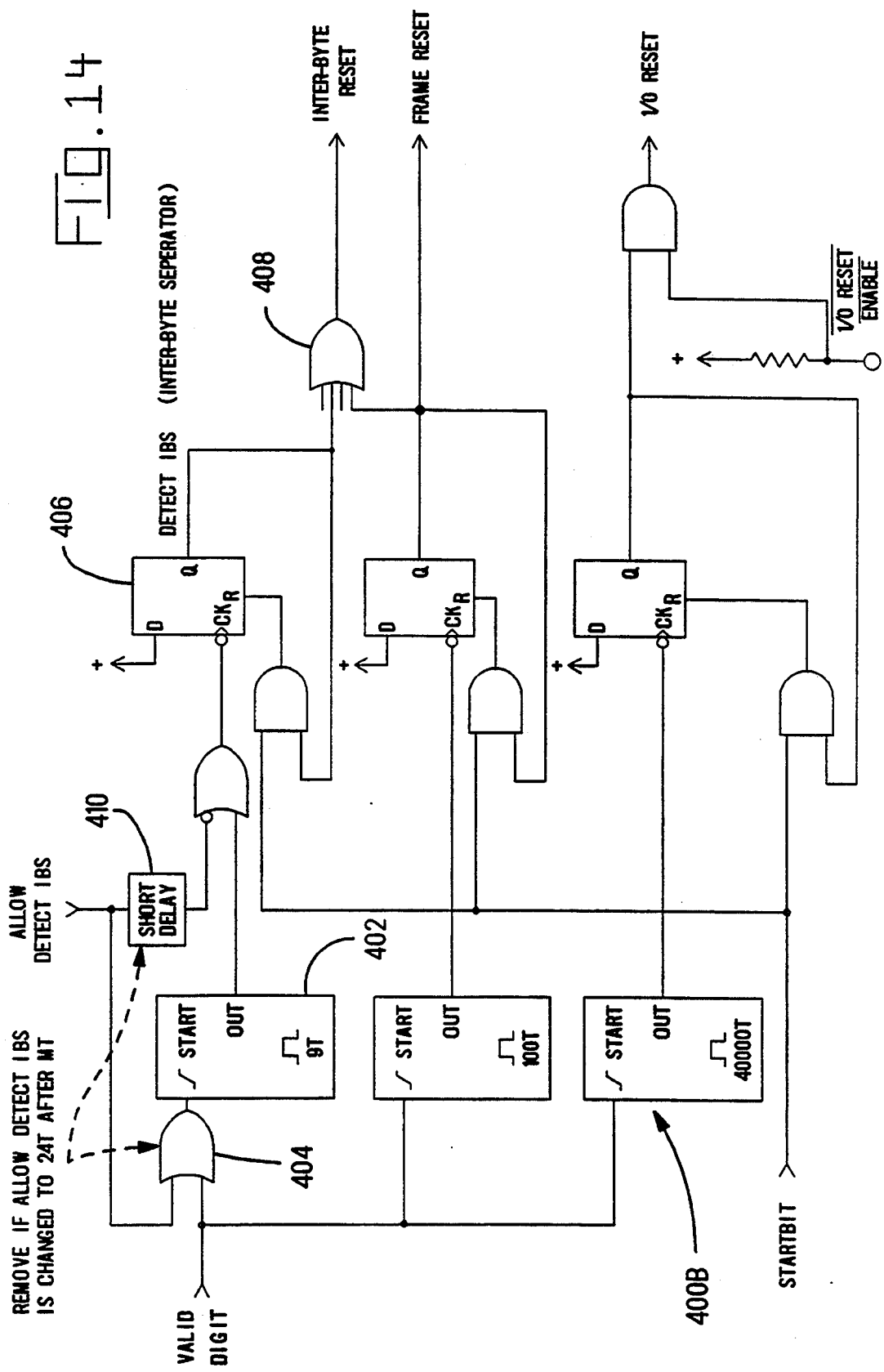
FIG. 14 illustrates another embodiment of the No Active Data Line Timer represented in block form in FIG. 4.
Figure 15:
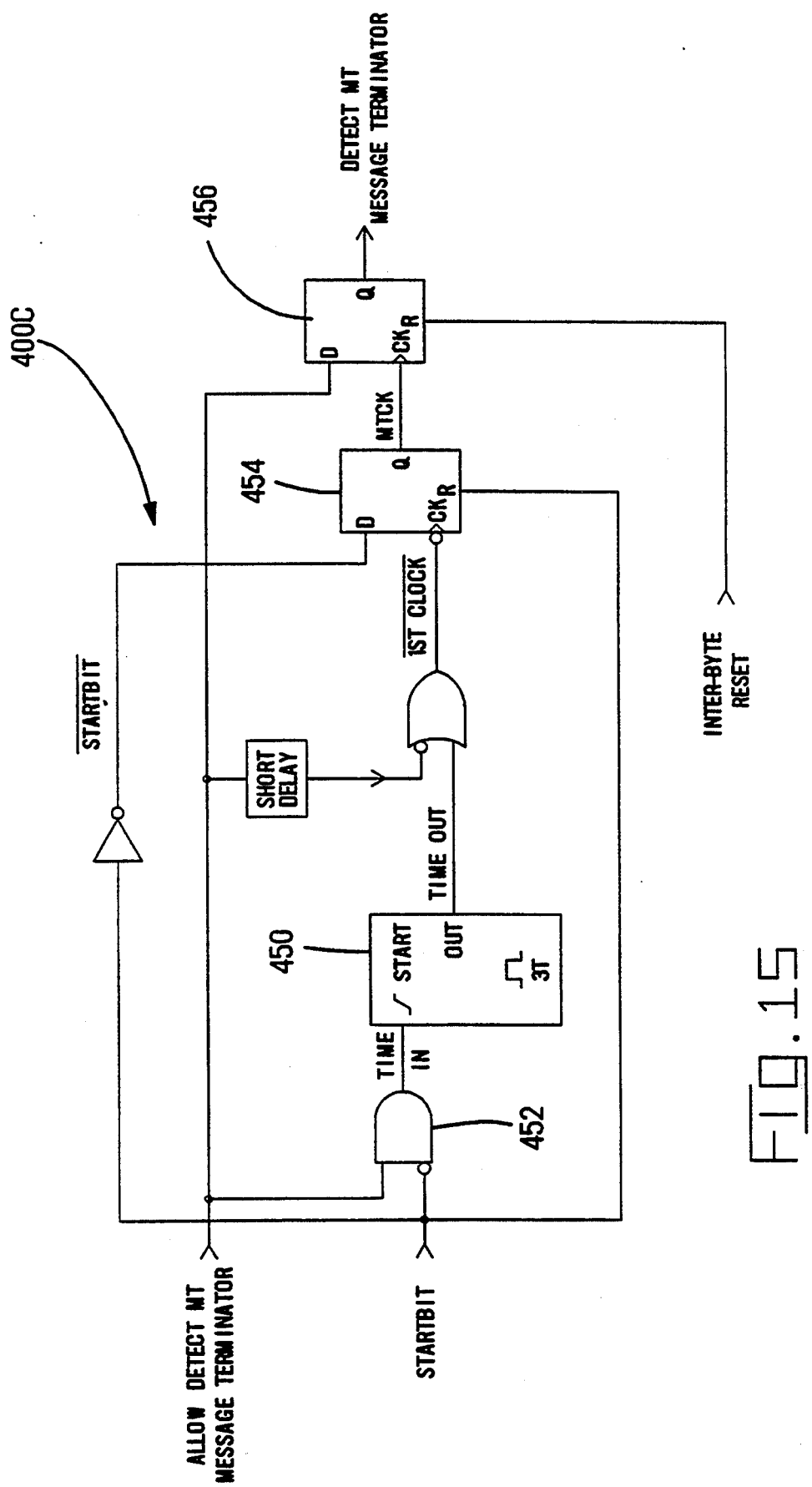
FIG. 15 illustrates another embodiment of a portion of No Active Data Line Timer, representing the detection of a Message Terminator (MT) signal.

An alternate implementation 400B for the composite counter 316 is shown in FIG. 14 for DETIBS and IBRESET and in FIG. 15 for the DETMT. Timer 402 is started by a rising edge on the input from an OR gate 404 which has as an input the VALDIG signal from INPSC. The output of the 9T timer 402 goes high immediately after its input is triggered and goes low 9T later. Additional rising edges on the input before 9T will reset the timer 402 to another 9T, thus keeping the output high. Therefore, the output of the timer 402 will only go low 9T from the last rising edge on its input. The trailing edge of the timer 402 output, if allowed by the ALLOWIBS, will clock flip-flop 406 which has its D-input tied high, causing the Q-output to go high providing DETIBS and IBSRESET (via OR gate 408).

There are two ways the ALLOWIBS signal can affect the circuit shown in FIG. 14. One way is to re-start the 9T timer 402 on the rising edge of ALLOWIBS. This, however, requires certain constraints. Since the rising edge of the ALLOWIBS is itself to re-start the 9T timer 402, if the 9T timer 402 has already timed out before the ALLOWIBS appears, the flip-flop 406 will clock prematurely because of propagation delay. Therefore, the output of timer 402 will not go high soon enough to prevent a low-going spike on the clock input of flip-flop 406. To solve this problem, a short delay section 410 is added to the ALLOWIBS signal which blocks access to the clock of the flip-flop 406, thus forcing a clean detection of a full 9T period of inactivity after the ALLOWIBS signal goes high. If, however, we do not require the ALLOWIBS before the 9T timer 402 times-out, (which is possible where no ASIC node is responding), then the rising edge of the ALLOWIBS will clock the status of flip-flop 406. Thus, the need to delay ALLOWIBS and re-trigger the 9T timer 402 on the rising edge of the ALLOWIBS is eliminated. However, the timing of ALLOWIBS must then be extended from 16T after MT to 25T after MT. Functionally, the 25T operation is identical to the 16T operation. The Q-output of flip-flop 406 as clocked by timer 402 is the actual IBS which causes an IBRESET (via OR gate 408). The reset to flip-flop 406 is the START-BIT signal from the INSPC. STARTBIT will only reset the flip-flop 406 if it has already been set. The main purpose of this connection is to not allow STARTBIT to override the flip-flop 406 if IBRESET has not yet become active.

An alternate circuit 400C for detecting MT is shown in FIG. 15. The main purpose of the MT is to determine when the controller is finished sending data to the ASIC nodes in a given frame. This is accomplished by monitoring data line activity using STARTBIT. STARTBIT goes high at 0.5T into a data digit and stays high until 0.2T after the S3 sample point which is 2.9T. The 3T timer 450 is triggered by AND gate 452 to start at the falling edge of STARTBIT which is at 3.1T. If STARTBIT returns high before the 3T timer 450 times out the MT is blocked by holding flip-flop 454 in a reset condition. This occurs, for example, whenever the controller is still sending data.

Figure 16:
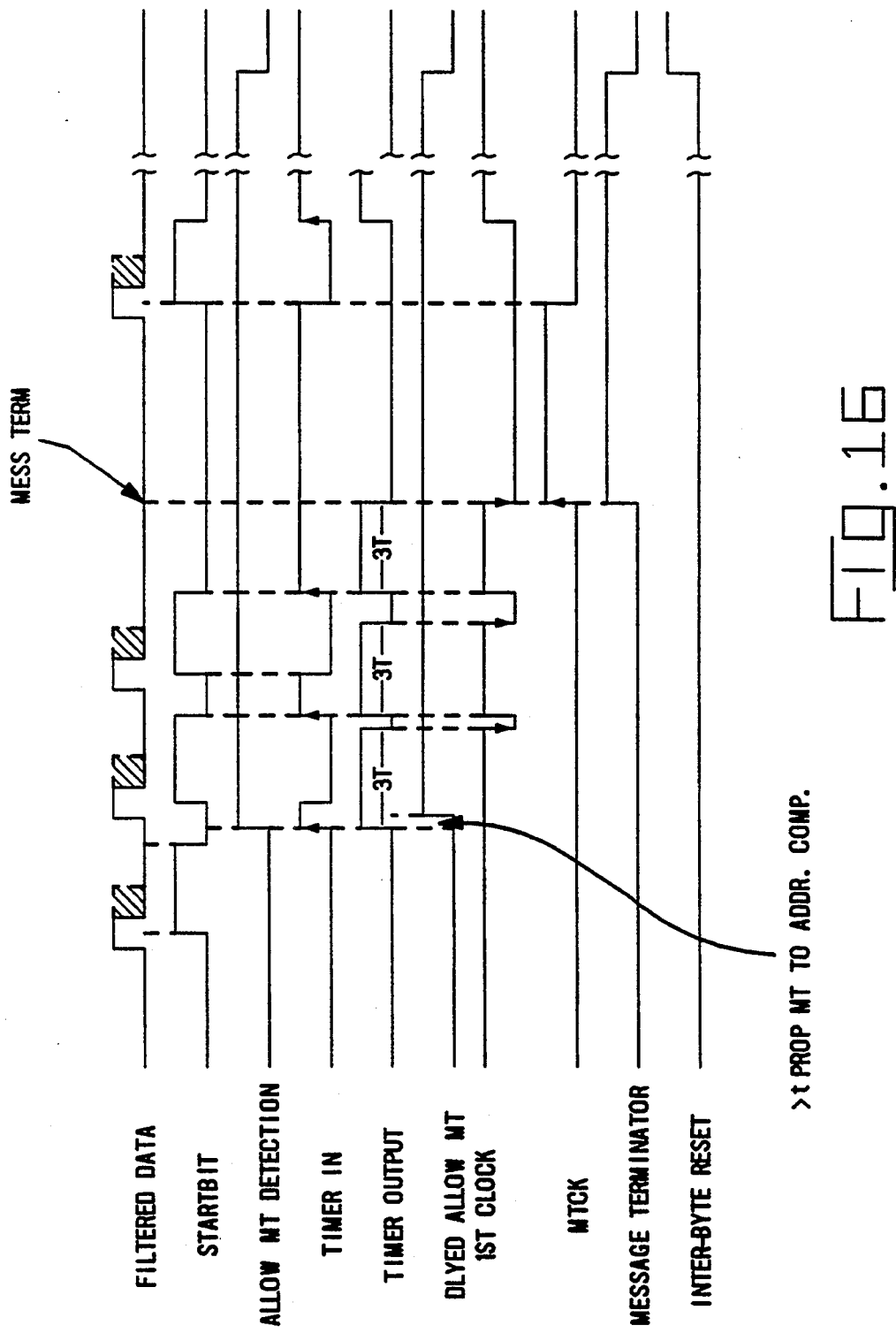
FIG. 16 is a timing diagram illustrating the detection of a MT signal.

The timer 450 is not allowed to start until ALLOWMT goes high. However, when ALLOWMT goes high, the timer 450 is only triggered if STARTBIT is low. This guarantees detection of a fresh 3T of no activity after the ALLOWMT signal goes high. The 3T timer 450, when allowed, is started by the falling edge of STARTBIT. The timer 450 will set flip-flop 454 only if STARTBIT remains low until the timer 450 times out. If the timer 450 times out while STARTBIT is low, the Q-output of a flip-flop 456 is set high which indicates MT. FIG. 16 is a timing diagram illustrating the various input and output states for the circuit 400C shown in FIG. 15.

Figure 17:
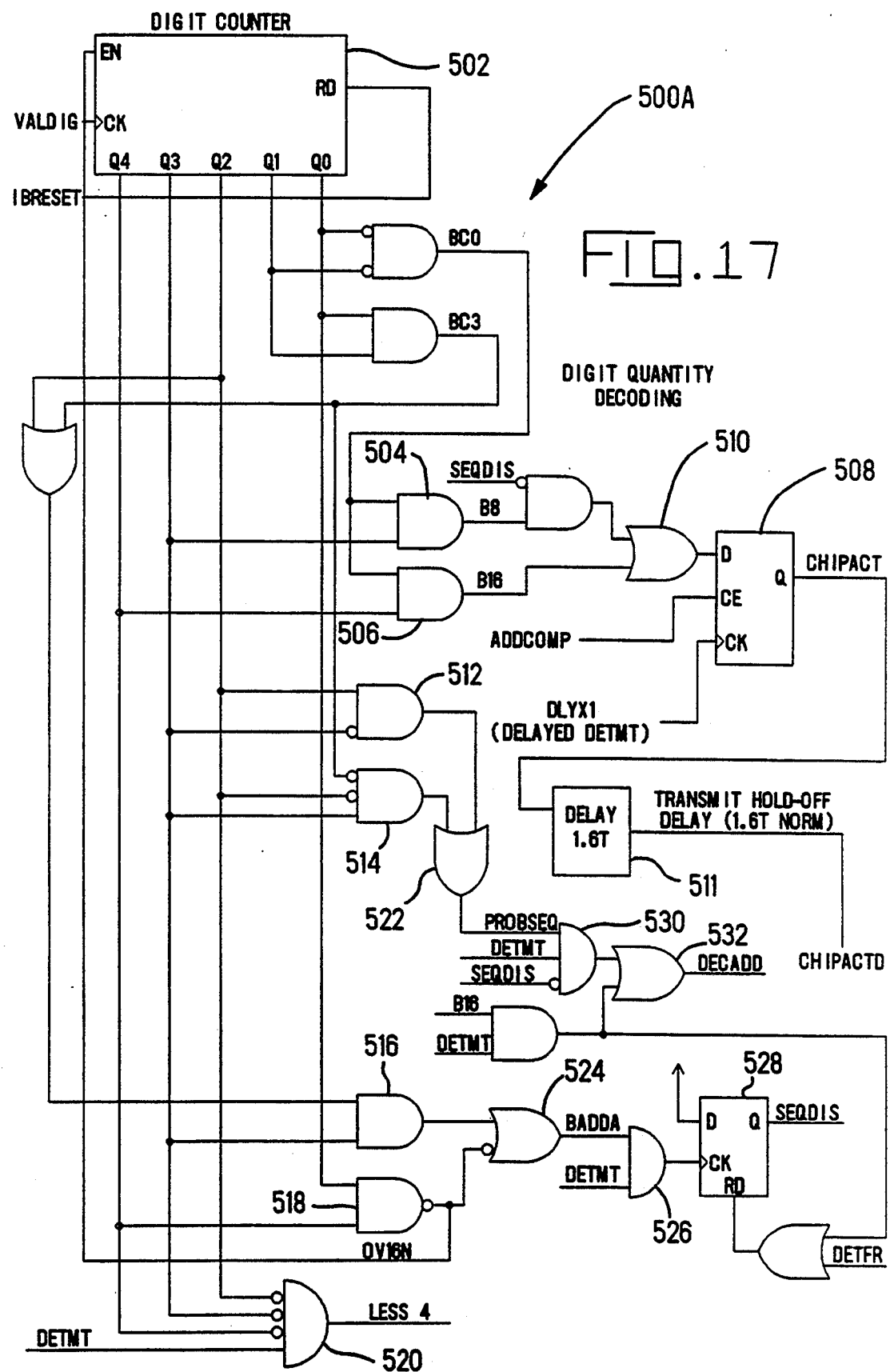
FIG. 17 illustrates an embodiment of the Digit Counter represented in block form in FIG. 4, including circuitry for decoding different error conditions.

FIG. 17 illustrates a more detailed schematic diagram at 500A of the Digit Counter (DC) 500 shown in FIG. 4. The counter 502 is a 5-bit binary counter with reset direct (RD) and count enable (EN). VALDIG is the clock input to the counter 502. Since VALDIG is disabled after detection of MT, the counter 502 only counts valid digits from the controller. There are several decoders, including 504, 506, 512, 514, 516, 518 and 520, connected to the counter outputs Q0–Q4 which give various signals and trigger various events depending on the number of digits counted when DETMT becomes active. The output of the decoder gate 504 is labeled B8, and, when high, indicates that eight digits have been counted. Similarly, the output of the decoder gate 506, labeled B16, is high when 16 digits have been counted. The output of the decoder gate 512 is high when either four, five, six or seven digits have been counted and the output of the decoder gate 514 is high when either eight, nine or ten digits have been counted. These outputs are provided as inputs to the OR gate 522 whose output is labeled PROBSEQ (standing for "probably sequential") and is high when four through ten digits have been counted. The output of the decoder gate 516 is high when eleven through fifteen digits have been counted and the output of the decoder gate 518 is low when more than sixteen digits have been counted. The output of the decoder gate 516 and the inverse of the output of the decoder gate 518 are ORed by the gate 524 whose output, labeled BADDA (standing for "bad direct access"), is high when eleven through fifteen or more than sixteen digits have been counted. The output of the decoder gate 520, labeled LESS4, is high when less than four digits have been counted. The output of the decoder gate 518, labeled OV16N, is used to enable the counter 502 so that the counter 502 can only reach a count of seventeen, at which point it will be disabled until an Inter-Byte Reset occurs.

The BADDA signal goes to the AND gate 526 whose other input is the signal DETMT. The output of the AND gate 526 is used to set the Sequential Disable flip-flop 528, whose Q-output is labeled SEQDIS. The SEQDIS signal is used to disable future receptions of sequential access transmissions from producing any action within the remote station, such as incrementing the address counter or transmitting data to the controller. The flip-flop 528 is reset by the reception of a valid direct access transmission or by the detection of the Frame Reset.

The PROBSEQ signal from the gate 522 goes to the AND gate 530. The output of this gate is high when the PROBSEQ signal is high, the DETMT signal is high, and the sequential disable flip-flop 528 is not active. The rising edge of the output of the AND gate 530 goes through the OR gate 532 and into the clock input of the address counter (not shown).

The LESS4 signal is already merged with DETMT in the gate 520. When this signal goes high, this will immediately cause an Inter-Byte Reset (through gate 328 in FIG. 11) if less than four digits were counted when DETMT goes high. When this occurs, the transmission probably was not sequential access or direct access, so a reset is initiated to immediately return to monitoring the transmission line for good transmissions.

The B8 signal, if not blocked by the sequential disable signal (SEQDIS), goes to the D-input of the chip active flip-flop 508. If flip-flop 508 is set, one clock pulse later the Transmit Pulse Generator (TPG) 600A (shown in FIG. 18) will start sending data back to the controller. In order for this flip-flop 508 to be set, the address compare signal (ADDCOMP) must be high which indicates that this ASIC node is being addressed. ADDCOMP is connected to the clock enable (CE) of flip-flop 508. The flip-flop 508 is clocked by a delayed DETMT pulse (DLYXa1) because of the propagation delays in the ASIC node. The B16 signal is also input to the D-input for flip-flop 508 via OR gate 510.

In summary, if fewer than four digits are received, the transmission is ignored. If four, five, six, seven, nine or ten digits are received, the transmission is treated as probably being a sequential access transmission and the address counter is updated. However, the data from the remote station is not transmitted. If more than ten, but not exactly sixteen, digits are received, further operation in a sequential access mode is disabled until either a frame reset is detected or a direct address is properly received. The only time that data from the remote station is latched and transmitted is when either exactly sixteen digits are received or when exactly eight digits are received and the sequential disable flip-flop 528 is not set.

Figure 18:
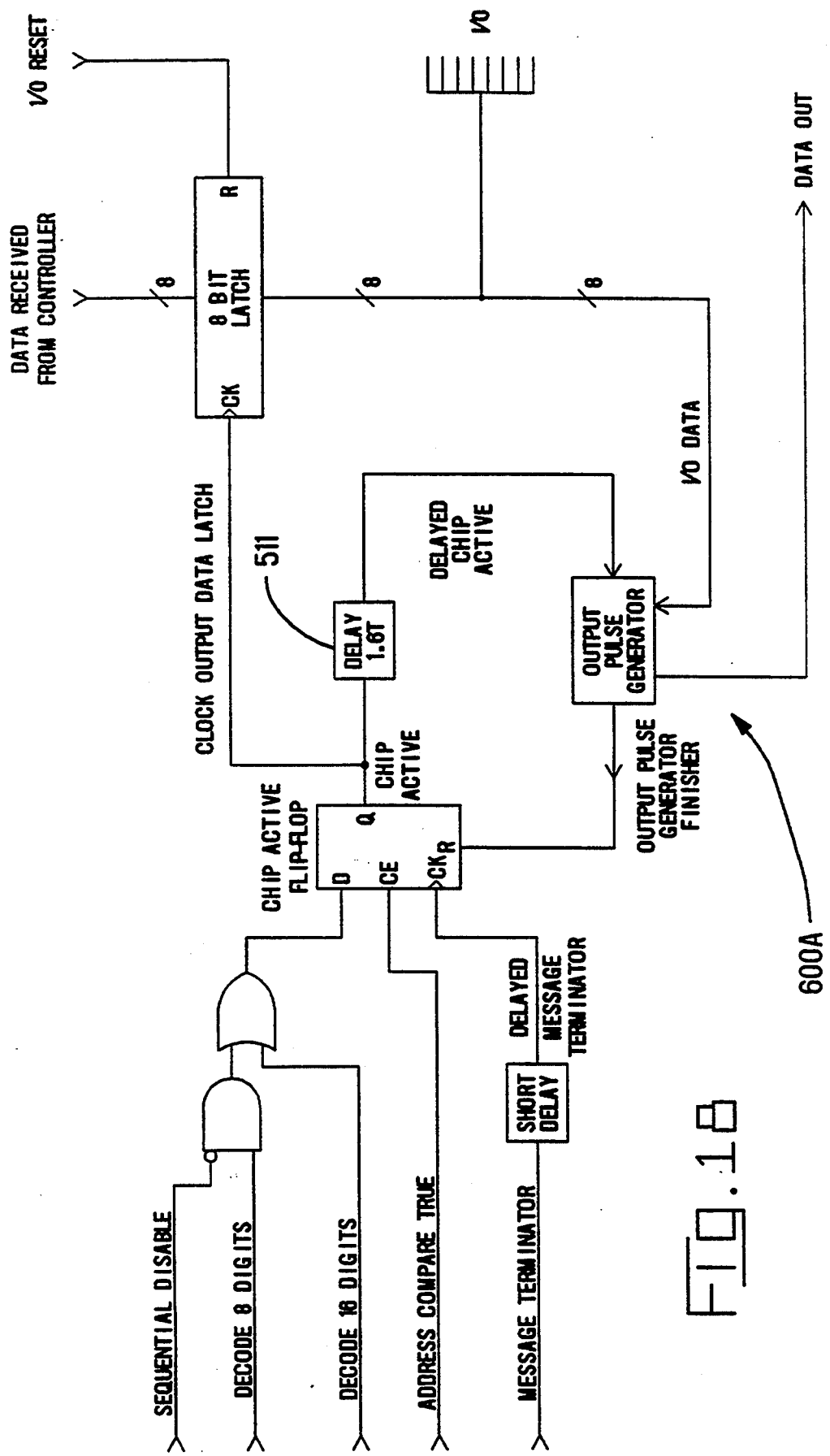
FIG. 18 illustrates the Output Pulse Generator represented in block form in FIG. 4.

The TPG 600A, as shown in FIG. 18, is enabled by a delayed chip active signal (CHIPACT D). The CHIPACT signal is delayed by a delay circuit 511. This delay is 1.6T and is referred to herein as Transmit Hold-Off Delay (THO). When TPG is disabled, its counters (not shown) are held reset and the DATAOUT is disabled.

FIGS. 19 and 20 are timing diagrams illustrating the overall operation of the ASIC and the various signals that perform the sequential and random access protocols and allow detection of IBS and MT. The timing of the MT signal is triggered by the detection of a 1st Valid Digit from the controller. The ASIC is then timed to detect an MT after either eight 4T digits or sixteen 4T digits. The detection of an MT triggers another set of timers, timed to detect an IBS at eight 4T digits after detection of an MT.

Thus, each transmission between the central controller and a remote device must be preceded by a minimum period of inactivity referred to herein as the IBS. This period of inactivity can be defined as any transmission line activity that does not appear as a valid digit when sampled at S1, S2 and S3. The transmission line may be in an active state for a portion or all of IBS as long as that activity does not appear as a valid digit. The timing diagrams in FIGS. 8 and 9 provide examples of transmission line activity which is rejected as invalid. The IBS synchronizes the network of nodes by fixing the boundaries of each transmission. The decoding, counting and storing of transmitted digits from the controller continues until the MT period of inactivity occurs.

What has been described are certain features and aspects of a multiplexing system which constitutes the presently preferred embodiment of the invention. The foregoing description and accompanying illustrations are merely exemplary and are in no way intended to limit the scope of the invention, which is defined solely by the appended claims and their equivalents.

We claim:

1. In a data transmission system including a control unit, a plurality of remote stations, a transmission line, and means for coupling said control unit and said plurality of remote stations to said transmission line, wherein the control unit transmits data to an addressed one of said plurality of remote stations in the form of data digits having a defined set of characteristics, the data transmission by the control unit including a first number of data digits when the remote stations are addressed sequentially from a first one of the remote stations to a last one of the remote stations and the data transmitted by the control unit including a second number of digits when a particular remote station is addressed directly, said second number of digits consisting of said first number of data digits plus a third number of address digits, each of the remote stations including means responsive to receipt of said second number of digits for recognizing its particular address from the third number of address digits and each of the remote stations including means responsive to receipt of only said first number of data digits for counting transmissions from the control unit, an arrangement in each of the remote stations comprising:

means for receiving signals on the transmission line;

means for validating the received signals as valid digits when the received signals have the defined set of characteristics;

means for counting the received valid digits;

means for detecting termination of a transmission from the control unit;

means for transmitting data to the control unit on the transmission line after detecting termination of a transmission from the control unit when the particular remote station has been addressed; and error means responsive to detection of termination of transmission from the control unit for examining the counted number of received valid digits and, when the counted number is less than a fourth number, causing the remote station to ignore the transmission.

2. The arrangement according to claim 1 wherein said fourth number equals one half of said first number.

3. The arrangement according to claim 1 wherein said error means further includes disable means for causing the remote station to inhibit transmissions to the control unit when further transmissions from the control unit do not include said second number of data digits, and means responsive to the counted number being in a first range between, but not including, said first number and said second number for enabling operation of said disable means, said disable means thereafter remaining enabled until being reset.

4. The arrangement according to claim 3 wherein said error means further includes means responsive to the counted number being equal to said second number for resetting said disable means.

5. The arrangement according to claim 4 further including frame reset means for detecting a predetermined period of no signals on the transmission line and said error means further includes means responsive to said frame reset means for resetting said disable means.

6. The arrangement according to claim 5 wherein said error means further includes means for enabling said transmitting means when the particular remote station has been addressed sequentially and said disable means is reset, and for enabling said transmitting means when the particular remote station has been addressed directly.

7. The arrangement according to claim 5 wherein said error means further includes means operative when said disable means is reset and responsive to the counted number of valid digits being in a second range from said fourth number up to, but not including, said first range, for incrementing the count of transmissions from the control unit.

* * * * *